(12) United States Patent
Loehr et al.

(10) Patent No.: US 9,439,158 B2
(45) Date of Patent: Sep. 6, 2016

(54) EFFICIENT EXTENDED POWER HEADROOM REPORTING FOR SEMI-PERSISTENT SCHEDULING

(75) Inventors: Joachim Loehr, Wiesbaden (DE); Christian Wengerter, Kleinheubach (DE); Martin Feuersaenger, Bremen (DE); Takashi Tamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 54 days.

(21) Appl. No.: 13/996,675

(22) PCT Filed: Mar. 2, 2012

(86) PCT No.: PCT/EP2012/000942
§ 371 (c)(1),
(2), (4) Date: Sep. 24, 2013

(87) PCT Pub. No.: WO2012/130373
PCT Pub. Date: Oct. 4, 2012

(65) Prior Publication Data
US 2014/0023010 A1  Jan. 23, 2014

(30) Foreign Application Priority Data
Apr. 1, 2011 (EP) .................................. 11160833

(51) Int. Cl.
*H04W 4/00* (2009.01)
*H04W 52/36* (2009.01)
(Continued)

(52) U.S. Cl.
CPC .......... *H04W 52/365* (2013.01); *H04W 52/34* (2013.01); *H04W 72/10* (2013.01); *H04W 72/1242* (2013.01); *H04W 72/1278* (2013.01); *Y02B 60/50* (2013.01)

(58) Field of Classification Search
CPC ....................................................... H04W 28/04
USPC ......................................................... 370/329
See application file for complete search history.

(56) References Cited

U.S. PATENT DOCUMENTS 6,463,055 B1  10/2002  Lupien et al.
2007/0037569 A1  2/2007  McNiff et al.
(Continued)

FOREIGN PATENT DOCUMENTS

EP    2293630 A1      3/2011
JP    2010-226720 A  10/2010
(Continued)

OTHER PUBLICATIONS

"3rd Generation Partnership 1-15 Project; Technical Specification Group Services and System Aspects; System Improvements for Machine-Type Communications; (Release 11)", 3GPP Draft; 23888-101-CL, 3rd Generation Partnership Project (3GPP), Mobile Competence Centre , 650, Route Des Lucioles , F-06921 Sophia-Antipolis Cedex , France, vol. SA WG2, no. Salt Lake City; Feb. 21, 2011, Feb. 15, 2011, XP050523560, p. 14, 46, 48 and 54.
(Continued)

*Primary Examiner* — Christopher R Crompton
(74) *Attorney, Agent, or Firm* — Pearne & Gordon LLP

(57) ABSTRACT

The invention relates to a method for transmitting power headroom information from a user equipment to the base station. The transmission is made dependent on scheduling type of the uplink resource, for which the power headroom information is to be calculated and over which it is to be transmitted. If the uplink resource is dynamically scheduled, then the extended power headroom report according to Rel. 10 is transmitted; if it is scheduled persistently, e.g. as part of a semi-persistent scheduling configuration, then a basic power headroom report according to Rel. 8/9 is transmitted. The invention circumvents the problem of delaying data in persistently allocated uplink resources when transmitting an extended power headroom report.

13 Claims, 12 Drawing Sheets

(51) Int. Cl.
*H04W 72/10* (2009.01)
*H04W 72/12* (2009.01)
*H04W 52/34* (2009.01)

(56) References Cited

U.S. PATENT DOCUMENTS

2010/0238863 A1    9/2010  Guo
2011/0292874 A1*  12/2011  Ho et al. .............. 370/328

FOREIGN PATENT DOCUMENTS

JP    2010-541474 A    12/2010
WO    2009/154403 A2   12/2009

OTHER PUBLICATIONS

"Keep MTC devices offline in non-communication status", 3GPP Draft;S2-110779, SIMTC Keep MTCDevice Offline, 3rd Generation Partnership Project (3GGP), Mobile Competence Centre, 650, Route Des Lucioles, F-06921 Sophia-Antipolis Cedex, France, vol. SA WG2, no. Salt Lake City; Feb. 21, 2011, Feb. 15, 2011, XP05023944, p. 2, 3 and 5.

"Key Issue for Transmission", 3GPP Draft; S2-110778, SIMTC Infrequent Transmission Key Issue, 3rd Gerneration Partnership Project (3GPP), Mobile Competence Centre, 650, Route Des Lucioles, F-06921 Sophia-Antipolis Cedex, France,vol. SA WG2, no. Salt Lake City; Feb. 21, 2011, Feb. 15, 2011, XP050523943, p. 2, 3 and 5.

European Search Report for Application No. EP 11002844 dated Sep. 23, 2011.

II LTE; Evolved Universal Terrestrial Radio Access (E-UTRA); Medium Access Control (MAC) protocol specification (3GPP TS 36.321 version 10.0.0 Release 10), Technical Specification, European Telecommunications Standards Institute (ETSI), 650, Route Des Lucioles; F-06921 Sophia-Antipolis; France, vol. 3GPP RAN 2, No. V10.0.0, Jan. 1, 2011, XP01462147.

Ericsson: "SR triggering in relation to uplink grants", 3GPP Draft; R2-081468, 3rd Generation Partnership Project (3GPP), Mobile Competence Centre; 650, Route Des Lucioles; F-06921 Sophia-Antipolis Cedex; France, vol. RAN WG2, no. Shenzhen, China; Mar. 25, 2008, XP050139212.

Motorola: "Power Headroom Reporting for CA", 3GPP Draft; R2-102762, 3rd Generation Partnership Project (3GPP), Mobile Competence Centre; 650, Route Des Lucioles; F-06921 Sophia-Antipolis Cedex; France, vol. RAN WG2, no. Montreal, Canada; May 10, 2010, May 4, 2010, XP050423121.

International Search Report for Application No. PCT/EP2012/000942 dated Jul. 23, 2012.

Notice of Reasons for Rejection issued in Japanese Patent Application No. 2014-501465 dated Dec. 8, 2015.

"PCMAX, c signalling optimisation" Alcatel-Lucent, Alcatel-Lucent Shanghai Bell, R2-110139, 3GPP TSG-RAN WG2 Meeting #72bis, Jan. 21, 2011.

* cited by examiner

EFFICIENT EXTENDED POWER HEADROOM REPORTING FOR SEMI-PERSISTENT SCHEDULING

FIELD OF THE INVENTION

The invention relates to a method for transmitting power headroom information from a user equipment to a base station, and to a user equipment for performing said method.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In a longer time perspective it is however necessary to be prepared for further increasing user demands and be competitive against new radio access technologies. To meet this challenge, 3GPP has initiated the study item Evolved UTRA and UTRAN, aiming at studying means for achieve additional substantial leaps in terms of service provisioning and cost reduction. As a basis for this word, 3GPP has concluded on a set of targets and requirements for a new mobile communication system which is called Long Term Evolution (LTE). LTE is designed to meet the carrier needs for high speed data and media transport as well as high capacity voice support to the next decade.

Peak data rates exceeding 100 Mbps for the downlink direction and 50 Mbps for the uplink direction Mean user throughput improved by factors 2 and 3 for uplink and downlink respectively Cell-edge user throughput improved by a factor 2 for uplink and downlink Uplink and downlink spectrum efficiency improved by factors 2 and 3 respectively.

Significantly reduced control-plane latency.

Reduced cost for operator and end user.

Spectrum flexibility, enabling deployment in many different spectrum allocations.

The ability to provide high bit rates is a key measure for LTE. Multiple parallel data stream transmission to a single terminal, using multiple-input-multiple-output (MIMO) techniques, is one important component to reach this. Larger transmission bandwidth and at the same time flexible spectrum allocation are other pieces to consider when deciding what radio access technique to use. The choice of adaptive multi-layer OFDM, AML-OFDM, in downlink will not only facilitate to operate at different bandwidths in general but also large bandwidths for high data rates in particular. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-Carrier Frequency Division Multiple Access (SC-FDMA) based radio access was adopted in the uplink, since provisioning of wide area coverage was prioritized over improvement in the peak data rate considering the restricted transmission power of the user equipment (UE).

Varying spectrum allocations, ranging from 1.25 MHz to 20 MHz, are supported by allocating corresponding numbers of AML-OFDM subcarriers. Operation in both paired and unpaired spectrum is possible as both time-division and frequency-division duplex is supported by AML-OFDM. In LTE, scalable multiple transmission bandwidths are specified such as 1.4, 3.0, 5.0, 10.0, 15.0, and 20.0 MHz, in order to achieve flexible system deployment using a given spectrum.

LTE Architecture

The overall architecture is shown in FIG. 1 and a more detailed representation of the E-UTRAN architecture is given in FIG. 2.

The E-UTRAN consists of eNodeBs, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs.

The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Hybrid ARQ Schemes

A common technique for error detection and correction in packet transmission systems over unreliable channels is called Hybrid Automatic Repeat reQuest (HARQ), Hybrid ARQ is a combination of Forward Error Correction (FEC) and ARQ.

Automatic Repeat-reQuest (ARQ) is an error control method for data transmission which uses acknowledgments and timeouts to achieve reliable data transmissions. An acknowledgment is a message sent by the receiver to the transmitter to indicate that it has correctly received a data packet. If the sender does not receive an acknowledgment before the timeout, being a reasonable time interval for receiving an acknowledgment, it usually re-transmits the frame until it receives an acknowledgment or exceeds a predefined number of re-transmissions.

Forward error correction is employed to control errors in data transmissions, wherein the sender adds redundant data to its messages. This enables the receiver to detect whether an error has occurred, and further allows to correct some errors without requesting additional data from the sender, Consequently, since within a certain limit FEC allows to correct some of the errors, re-transmission of data packets can often be avoided. However, due to the additional data that is appended to each data packet, this comes at the cost of higher bandwidth requirements.

If a FEC encoded packet is transmitted and the receiver fails to decode the packet correctly (errors are usually checked by a CRC (Cyclic Redundancy Check)), the receiver requests a re-transmission of the packet.

In LTE there are two levels of re-transmissions for providing reliability, namely, HARQ at the MAC layer and the outer ARQ at the RLC layer. The outer ARQ is required to handle residual errors that are not corrected by HARQ that is kept simple by the use of a single bit error-feedback mechanism, i.e. ACK/NACK. An N-process stop-and-wait HARQ is employed that has asynchronous re-transmissions in the DL and synchronous re-transmissions in the UL. Synchronous HARQ means that the re-transmissions of HARQ blocks occur at pre-defined periodic intervals. Hence, no explicit signaling is required to indicate to the receiver the retransmission schedule. Asynchronous HARQ offers the flexibility of scheduling re-transmissions based on air interface conditions. In this case some identification of the HARQ process needs to be signaled in order to allow for a correct combining and protocol operation.

The HARQ protocol operation for downlink data transmission will be similar or even identical to HSDPA.

In HARQ protocol operation for uplink data transmission there are two different options on how to schedule a retransmission. Retransmissions are either scheduled by a NACK (for synchronous non-adaptive retransmissions) or explicitly scheduled by a PDCCH (for synchronous adaptive retransmissions). In case of a synchronous non-adaptive retransmission, the retransmission will use the same parameters as the previous uplink transmission, i.e. the retransmission will be signaled on the same physical channel resources respectively uses the same modulation scheme.

Since synchronous adaptive retransmissions are explicitly scheduled via PDCCH, the eNB has the possibility to change certain parameters for the retransmission. A retransmission could be for example scheduled on a different frequency resource in order to avoid fragmentation in the uplink, or eNB could change the modulation scheme or alternatively indicate UE what redundancy version to use for the retransmission.

It should be noted that the HARQ feedback (ACK/NACK) and PDCCH signaling occurs at the same timing. Therefore, UE only needs to check once whether a synchronous non-adaptive retransmission is triggered, i.e. only NACK is received, or whether eNB requests a synchronous adaptive retransmission, i.e. PDCCH is signaled.

Layer 1/Layer 2 (L1/L2) Control Signaling

In order to inform the scheduled users about their allocation status, transport format and other data related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from sub-frame to sub-frame. It should be noted that user allocation might also be performed on a TTI (Transmission Time Interval) basis, where the TTI length is a multiple of the subframes. The TTI length may be fixed in a service area for all users, may be different for different users, or may even by dynamic for each user. Generally, the L1/2 control signaling needs only be transmitted once per TTI. The L1/L2 control signaling is transmitted on the Physical Downlink Control Channel (PDCCH). It should be noted that in 3GPP LTE, assignments for uplink data transmissions, also referred to as uplink scheduling grants or uplink resource assignments, are also transmitted on the PDCCH.

Downlink & Uplink Data Transmission

Regarding downlink data transmission, L1/L2 control signaling is transmitted on a separate physical channel (PDCCH), along with the downlink packet data transmission. Downlink control information occurs in several formats that differ in overall size and also in the information contained in its fields. The different DCI formats that are currently defined for LTE Release 8/9 (3GPP LTE) are described in detail in 3GPP TS 36.212, "Multiplexing and channel coding (Release 9)", version 8.8.0 or 9.0.0, section 5.3.3.1 (available at http://www.3gpp.org and incorporated herein by reference). This L1/L2 control signaling typically contains information on:

The physical resource(s) on which the data is transmitted (e.g. subcarriers or subcarrier blocks in case of OFDM, codes in case of CDMA). This information allows the UE (receiver) to identify the resources on which the data is transmitted.

When user equipment is configured to have a Carrier Indication Field (CIF) in the L1/L2 control signaling, this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e. the cross-scheduled component carrier does not carry any L1/L2 control signaling.

The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.

Hybrid ARQ (HARQ) information:
  HARQ process number: Allows the user equipment to identify the hybrid ARQ process on which the data is mapped.
  Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.
  Redundancy and/or constellation version: Tells the user equipment, which hybrid ARQ redundancy version is used (required for de-rate-matching) and/or which modulation constellation version is used (required for demodulation).
  UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:
  The physical resource(s) on which the user equipment should transmit the data (e.g. subcarriers or subcarrier blocks in case of OFDM, codes in case of CDMA).
  When user equipment is configured to have a Carrier Indication Field (CIF) in the L1/L2 control signaling, this information identifies the component carrier for which the specific control signaling information is intended. This enables assignments to be sent on one component carrier which are intended for another component carrier. This other, cross-scheduled component carrier may be for example a PDCCH-less component carrier, i.e. the cross-scheduled component carrier does not carry any L1/L2 control signaling.
  L1/L2 control signaling for uplink grants is sent on the DL component carrier that is linked with the uplink component carrier or on one of the several DL component carriers, if several DL component carriers link to the same UL component carrier.
  The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g. the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.
  Hybrid ARQ information:
    Sequence number or new data indicator: Tells the user equipment to transmit a new packet or to retransmit a packet.
    Redundancy and/or constellation version: Tells the user equipment, which hybrid ARQ redundancy version to use (required for rate-matching) and/or which modulation constellation version to use (required for modulation).
  UE Identity (UE ID): Tells which user equipment should transmit data. In typical implementations this information is used to mask the CRC of the L1/L2 control signaling in order to prevent other user equipments to read this information.

There are several different possibilities how to exactly transmit the information pieces mentioned above in uplink and downlink data transmission. Moreover, in uplink and downlink, the L1/L2 control information may also contain additional information or may omit some of the information. For example:
  A redundancy and/or constellation version may not be needed, and thus not signaled, if Chase Combining is used (always the same redundancy and/or constellation version) or if the sequence of redundancy and/or constellation versions is pre-defined.
  Power control information may be additionally included in the control signaling.
  MIMO related control information, such as e.g. precoding, may be additionally included in the control signaling.
  In case of multi-codeword MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore, it should be noted that the redundancy version (RV) information is jointly encoded with the transport format information, i.e. the RV information is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RV 0. The TBS/RV signaling for uplink assignments transmitted on PDCCH for PUSCH is shown in the following Table 1 (taken from standard TS 36.213, Table 8.6.1-1).

TABLE 1

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |

TABLE 1-continued

| MCS Index $I_{MCS}$ | Modulation Order $Q_m$ | TBS Index $I_{TBS}$ | Redundancy Version $rv_{idx}$ |
|---|---|---|---|
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | | | 1 |
| 30 | reserved | | 2 |
| 31 | | | 3 |

The size of the CRC field of the PDCCH is 16 bits. The calculation of the modulation order and transport block size is described in section 8.6.2 of the standard TS 36.213 (available at http://www.3gpp.org and incorporated herein by reference). The transport block size tables used for uplink PUSCH transmissions can be found in section 7.1.7.2.1 of standard TS 36.213 (available at http://www.3gpp.org and incorporated herein by reference).

For downlink assignments (PDSCH) signaled on PDCCH in LTE the Redundancy Version (RV) is signaled separately in a two-bit field. Furthermore, the modulation order information is jointly encoded with the transport format information. Similar to the uplink case there is a 5 bit MCS field signaled on PDCCH. Three of the entries are reserved to signal an explicit modulation order, providing no Transport format (Transport block) info. For the remaining 29 entries modulation order and Transport block size info are signaled as shown in the following Table 2 for PDSCH (taken from standard TS 36.213, Table 7.1.7.1-1).

TABLE 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |

TABLE 2-continued

| MCS Index $I_{MCS}$ | Modulation Order $Q_m$ | TBS Index $I_{TBS}$ |
|---|---|---|
| 29 | 2 | |
| 30 | 4 | reserved |
| 31 | 6 | |

The calculation of modulation order and transport block size is described in section 7.17 of standard TS 36.213.

Semi-Persistent Scheduling (SPS)

In the downlink and uplink, the scheduling eNodeB dynamically allocates resources to user equipments at each transmission time interval via the L1/L2 control channel(s) (PDCCH) where the user equipments are addressed via their specific C-RNTIs. As already mentioned before, the CRC of a PDCCH is masked with the addressed user equipment's C-RNTI (so-called dynamic PDCCH). Only a user equipment with a matching C-RNTI can decode the PDCCH content correctly, i.e. the CRC check is positive. This kind of PDCCH signaling is also referred to as dynamic (scheduling) grant. A user equipment monitors at each transmission time interval the L1/L2 control channel(s) for a dynamic grant in order to find a possible allocation (downlink and uplink) it is assigned to.

In addition, E-UTRAN can allocate uplink/downlink resources for initial HARQ transmissions persistently. When required, retransmissions are explicitly signaled via the L1/L2 control channel(s). Since retransmissions are dynamically scheduled, this kind of operation is referred to as semi-persistent scheduling (SPS), i.e. resources are allocated to the user equipment on a semi-persistent basis (semi-persistent resource allocation). The benefit is that PDCCH resources for initial HARQ transmissions are saved. Semi-persistent scheduling may be used in the PCell in Release 10, but not in an SCell.

One example for a service, which might be scheduled using semi-persistent scheduling, is Voice over IP (VoIP). Every 20 ms a VoIP packet is generated at the codec during a talk-spurt. Therefore, eNodeB could allocate uplink or respectively downlink resources persistently every 20 ms, which could be then used for the transmission of Voice over IP packets. In general, semi-persistent scheduling is beneficial for services with a predictable traffic behavior, i.e. constant bit rate, packet arrival time is periodic.

The user equipment also monitors the PDCCHs in a subframe where it has been allocated resources for an initial transmission persistently. A dynamic (scheduling) grant, i.e. PDCCH with a C-RNTI-masked CRC, can override a semi-persistent resource allocation. In case the user equipment finds its C-RNTI on the L1/L2 control channel(s) in the sub-frames where the user equipment has a semi-persistent resource assigned, this L1/L2 control channel allocation overrides the persistent resource allocation for that transmission time interval, and the user equipment does follow the dynamic grant. When user equipment doesn't find a dynamic grant, it will transmit/receive according to the semi-persistent resource avocation.

The configuration of semi-persistent scheduling is done by RRC signaling. For example the periodicity, e.g. PS_PERIOD, of the persistent allocation is signaled within Radio resource Control (RRC) signaling. The activation of a persistent allocation and also the exact timing as well as the physical resources and transport format parameters are sent via PDCCH signaling. Once semi-persistent scheduling is activated, the user equipment follows the semi-persistent resource allocation according to the SPS activation PDCCH every PS_PERIOD. Essentially, the user equipment stores the SPS activation PDCCH content and follows the PDCCH with the signaled periodicity.

In order to distinguish a dynamic PDCCH from a PDCCH which activates semi-persistent scheduling (also referred to as SPS activation PDCCH), a separate identity is introduced. Basically, the CRC of an SPS activation PDCCH is masked with this additional identity which is in the following referred to as SPS C-RNTI. The size of the SPS C-RNTI is also 16 bits, same as the normal C-RNTI. Furthermore, the SPS C-RNTI is also user equipment-specific, i.e. each user equipment configured for semi-persistent scheduling is allocated a unique SPS C-RNTI.

In case a user equipment detects that a semi-persistent resource allocation is activated by a corresponding SPS activation PDCCH, the user equipment will store the PDCCH content (i.e. the semi-persistent resource assignment) and apply it every semi-persistent scheduling interval, i.e. periodicity signaled via RRC. As already mentioned, a dynamic allocation, i.e. signaled on dynamic PDCCH, is only a "one-time allocation". Retransmissions of an SPS allocation are also signaled using the SPS C-RNTI. In order to distinguish the SPS activation from an SPS re-transmission, the NDI (new data indicator) bit is used. An SPS activation is indicated by setting the NDI bit to 0. An SPS PDCCH with the NDI-bit set to 1 indicates a re-transmission for an semi-persistently scheduled initial transmission.

Similar to the activation of semi-persistent scheduling, the eNodeB also can deactivate semi-persistent scheduling, also called SPS resource release. There are several options how a semi-persistent scheduling de-allocation can be signaled. One option would be to use PDCCH signaling with some PDCCH fields set to some predefined values, i.e. SPS PDCCH indicating a zero size resource allocation. Another option would be to use MAC control signaling.

Component Carrier Structure in LTE

The downlink component carrier of a 3GPP LTE system is subdivided in the time-frequency domain in so-called sub-frames. In 3GPP LTE each sub-frame is divided into two downlink slots as shown in FIG. 3, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols thus each consist of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved in the 3GPP. The study item covers technology components to be considered for the evolution of E-UTRA, e.g. to fulfill the requirements on IMT-Advanced. Two major technology components which are currently under consideration for LTE-A are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In Carrier Aggregation (CA), two or more Component Carriers (CCs) are aggregated in order to support wider transmission bandwidths up to 100 MHz. Several carriers in the LTE system are aggregated into one wider channel in the LTE-Advanced system which is wide enough for 100 MHz, even though these carriers in LTE are in different frequency bands. On the aggregated wider channel, an LTE-Advanced user equipment can access several spectrum fragments simultaneously. Meanwhile, an LTE user equipment can access only one spectrum fragment of them, thus meeting the need for spectral compatibility as well as reducing the costs of bits.

All component carriers can be configured to be 3GPP LTE Release 8/9 compatible, at least when the aggregated numbers of component carriers in the uplink and the downlink are the same. This does not necessarily mean that all component carriers need to be compatible to 3GPP LTE (Release 8/9).

A user equipment may simultaneously receive or transmit on one or multiple component carriers. On how many component carriers simultaneous reception/transmission is possible, is depending on the capabilities of a user equipment.

A 3GPP LTE (Release 8/9) compatible user equipment can receive and transmit on a single CC only, provided that the structure of the CC follows the 3GPP LTE (Release 8/9) specifications, while a 3GPP LTE-A (Release 10) compatible user equipment with reception and/or transmission capabilities for carrier aggregation can simultaneously receive and/or transmit on multiple component carriers.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may not be possible to configure a UE with more uplink component carriers than downlink component carriers.

In a typical TDD deployment, the number of component carriers and the bandwidth of each component carrier in uplink and downlink is the same. Component carriers originating from the same eNodeB need not to provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected mode. Within the configured set of component carriers, other cells are referred to as Secondary Cells (SCells). The characteristics of the downlink and uplink PCell are:

The uplink PCell is used for transmission of Layer 1 uplink control information
  The downlink PCell cannot be de-activated, unlike SCells
  Re-establishment is triggered when the downlink PCell experiences Rayleigh fading (RLF), not when downlink SCells experience RLF
  The downlink PCell cell can change with handover
  Non-access stratum information is taken from the downlink PCell
  PCell can only be changed with handover procedure (i.e. with security key change and RACH procedure)
  PCell is used for transmission of PUCCH The configuration and reconfiguration of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is one pair of uplink and downlink component carriers that is always active. The downlink component carrier of that pair might be also referred to as 'DL anchor carrier'. Same applies also for the uplink.

When carrier aggregation is configured, a user equipment may be scheduled over multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking between uplink and downlink component carriers allows identifying the uplink component carrier for which the grant applies when there is no-cross-carrier scheduling.

(De)Activation of a Component Carrier and DRX Operation

In carrier aggregation, whenever a UE is configured with only one component carrier, discontinued reception (DRX) according to Rel. 8/9 applies. In other cases, the same DRX operation applies to all configured and activated component carriers (i.e. identical active time for PDCCH monitoring). When in active time, any component carrier may always schedule PDSCH on any other configured and activated component carrier (further restrictions FFS).

To enable reasonable UE battery consumption when CA is configured, a component carrier activation/deactivation mechanism for DL SCells is introduced (i.e. activation/deactivation does not apply to the PCell). When a SCell is not active, the UE does not need to receive the corresponding PDCCH or PDSCH, nor is it required to perform CQI measurements. Conversely, when a downlink SCell is active, the UE shall receive PDSCH and PDCCH (if present), and is expected to be able to perform CQI measurements. Similarly, for an deactivated Scell the UE shall also not transmit UL-SCH on SCells and transmit sounding reference signals (SRS) on SCells.

Other details of the activation/deactivation mechanism for SCells are:

Explicit activation of SCells is done by MAC signaling;
  Explicit deactivation of SCells is done by MAC signaling;
  Implicit deactivation of SCells is also possible;
  SCells can be activated and deactivated individually, and a single activation/deactivation command can activate/deactivate a subset of the configured downlink SCells;
  SCells added to the set of configured CCs are initially "deactivated".

UL Rate Control/Logical Channel Prioritization Procedure

The UE has an uplink rate control function which manages the sharing of uplink resources between radio bearers. This uplink rate control function is also referred to as logical channel prioritization procedure in the following. The Logical Channel Prioritization (LCP) procedure is applied when a new transmission is performed, i.e. when a Transport block needs to be generated. One proposal for assigning capacity has been to assign resources to each bearer in priority order, until each has received an allocation equivalent to the minimum data rate for that bearer. After this, any additional capacity is assigned to bearers in, for example, priority order.

As will become evident from the description of the LCP procedure given below, the implementation of the LCP procedure residing in the UE is based on the token bucket model, which is well known in the IP world. The basic functionality of this model is as follows. Periodically and at a given rate, a token, which represents the right to transmit a quantity of data, is added to the bucket. When the UE is granted resources, it is allowed to transmit data up to the amount represented by the number of tokens in the bucket. When transmitting data, the UE removes the number of tokens equivalent to the quantity of transmitted data. In case the bucket is full, any further tokens are discarded.

For the addition of tokens it can be assumed that the period of the repetition of this process would be every TTI, but it could be easily lengthened such that a token is only added every second. Basically, instead of adding a token to the bucket every 1 ms, 1000 tokens could be added every second. In the following the logical channel prioritization procedure which is used in Rel-8 is described (see standard TS36.321 incorporated herein by reference).

RRC controls the scheduling of uplink data by signaling for each logical channel:
  priority where an increasing priority value indicates a lower priority level,
  prioritisedBitRate which sets the Prioritized Bit Rate (PBR),
  bucketSizeDuration which sets the Bucket Size Duration (BSD).

The idea behind a prioritized bit rate is to support for each bearer, including low priority non-GBR bearers, a minimum bit rate in order to avoid a potential starvation. Each bearer should at least get enough resources in order to achieve the prioritized bit rate (PBR).

The UE shall maintain a variable $Bj$ for each logical channel j. Bj shall be initialized to zero and incremented by the product PBR×TTI duration for each TTI when the related logical channel is established, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:
  The UE shall allocate resources to the logical channels in the following steps:
  Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);
  Step 2: the UE shall decrement Bj by the total size of MAC SDUs served to logical channel j in Step 1
  NOTE: The value of Bj can be negative.
  Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.
The UE shall also follow the rules below during the scheduling procedures above:
  The UE should not segment an RLC SDU (or partially transmitted SDU or retransmitted RLC PDU) if the whole SDU (or partially transmitted SDU or retransmitted RLC PDU) fits into the remaining resources;
  If the UE segments an RLC SDU from the logical channel, it shall maximize the size of the segment to fill the grant as much as possible;
  UE should maximise the transmission of data.

For the Logical Channel Prioritization procedure, the UE shall take into account the following relative priority in decreasing order:
  MAC control element for C-RNTI or data from UL-CCCH;
  MAC control element for BSR (Buffer Status Reports), with exception of BSR included for padding;
  MAC control element for PHR or Extended PHR;
  data from any Logical Channel, except data from UL-CCCH;
  MAC control element for BSR included for padding.

When the UE is requested to transmit multiple MAC PDUs in one TTI, e.g. in case of carrier aggregation or UL spatial multiplexing, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when UE is requested to transmit multiple MAC PDUs in one TTI.

Power Control

Uplink transmitter power control in a mobile communication system serves the purpose of balancing the need for sufficient transmitter energy per bit to achieve the required QoS against the need to minimize interference to other users of the system and to maximize the battery life of the user equipment. The role of the Power Control (PC) becomes decisive to provide the required SINR (Signal-to-Interference plus Noise Ratio) while controlling at the same time the interference caused to neighboring cells. The idea of classic PC schemes in uplink is that all users are received with the same SINR, which is known as full compensation. As an alternative, the 3GPP has adopted the use of Fractional Power Control (FPC) for LTE Rel. 8/9. This functionality makes users with a higher path-loss operate at a lower SINR requirement so that they will more likely generate less interference to neighboring cells.

The power control scheme provided in LTE Rel. 8/9 employs a combination of open-loop and closed-loop control. A mode of operation involves setting a coarse operating point for the transmission power density spectrum by open-loop means based on path-loss estimation. Faster operation can then be applied around the open-loop operating point by closed-loop power control. This controls interference and fine-tunes the power settings to suit the channel conditions including fast fading.

With this combination of mechanisms, the power control scheme in LTE Rel. 8/9 provides support for more than one mode of operation. It can be seen as a toolkit for different power control strategies depending on the deployment scenario, the system load and operator preference.

The detailed power control formulae are specified in LTE Rel. 8/9 for the Physical Uplink Shared Channel (PUSCH), Physical Uplink Control Channel (PUCCH) and the Sounding Reference Signals (SRS) in section 5.1 in 3GPP TS 36.213, available at http://www.3gpp.org and incorporated herein by reference. The formula for each of these uplink signals follows the same basic principles; in all cases they can be considered as a summation of two main terms: a basic open-loop operating point derived from static or semi-static parameters signaled by the eNodeB, and a dynamic offset updated from subframe to subframe.

The basic open-loop operating point for the transmit power per resource block depends on a number of factors including the inter-cell interference and cell load. It can be further broken down into two components, a semi-static base level $P_0$, further comprised of a common power level for all user equipments in the cell (measured in dBm) and a UE-specific offset, and an open-loop path-loss compensation component. The dynamic offset part of the power per resource block can also be further broken down into two components, a component dependent on the used MCS and explicit Transmitter Power Control (TPC) commands.

The MCS-dependent component (referred to in the LTE specifications as $\Delta_{TF}$, where TF stands for "Transport Format") allows the transmitted power per resource block to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signaling—i.e. the mode cannot be changed dynamically. With the accumulative TPC commands, each TPC command signals a power step relative to the previous level.

The setting of the UE Transmit power $P_{PUSCH}$ [dBm] for the PUSCH transmission in reference sub-frame i is defined as apparent from section 5.1.1.1 of 3GPP TS 36.213, which is incorporated herein by reference.

Power Headroom Reporting

In order to assist the eNodeB to schedule the uplink transmission resources to different user equipments in an appropriate way, it is important that the user equipment can report its available power headroom to eNodeB. The eNodeB can use the power headroom reports to determine how much more uplink bandwidth per sub-frame a user equipment is capable of using. This helps to avoid allocating uplink transmission resources to user equipments which are unable to use them in order to avoid a waste of resources.

The range of the power headroom report is from +40 to −23 dB (see 3GPP TS 36.133, available at http//www.3gpp.org and incorporated in its entirety herein by reference). The negative part of the range enables the user equipment to signal to the eNodeB the extent to which it has received an UL grant which would require more transmission power than the UE has available. This would enable the eNodeB to reduce the size of a subsequent grant, thus freeing up transmission resources to allocate to other UEs.

A power headroom report can only be sent in sub-frames in which a UE has an UL transmission grant. The report relates to the sub-frame in which it is sent. The headroom report is therefore a prediction rather than a direct measurement; the UE cannot directly measure its actual transmission power headroom for the subframe in which the report is to be transmitted. It therefore relies on reasonably accurate calibration of the UE's power amplifier output.

A number of criteria are defined to trigger a power headroom report. These include:

More than a configured number of closed-loop TPC commands have been implemented by the UE The eNodeB can configure parameters to control each of these triggers depending on the system load and the requirements of its scheduling algorithm. To be more specific, RRC controls power headroom reporting by configuring the two timers periodicPTIR-Timer and prohibitPHR-Timer, and by signalling dl-PathlossChange which sets the change in measured downlink pathloss to trigger a power headroom report.

The power headroom report is sent as a MAC Control Element. It consists of a single octet where the two highest bits are reserved and the six lowest bits represent the 64 dB values mentioned above in 1 dB steps. The structure of the MAC Control Element is shown in FIG. 7.

The R fields are reserved bits and set to "0". The Power Headroom (PH) field indicates the power headroom level. The length of the field is 6 bits. The reported power headroom and the corresponding power headroom levels are shown in Table 6.1.3.6-1 of Standard TS 36.321.

The UE power headroom PH [dB] valid for sub-frame i is defined by (see section 5.1.1.2 of 3GPP TS 36.213):

$$PH(i) = P_{CMAX} - \{10 \cdot \log_{10}(M_{PUSCH}(i)) + P_{0\_PUSCH}(j) + \alpha(j) \cdot PL + \Delta_{TF}(i) + f(i)\} \qquad \text{Equation 1}$$

The power headroom is rounded to the closest value in the range [40; −23] dB with steps of 1 dB. $P_{CMAX}$ is the total maximum UE transmit power (i.e. total maximum transmit power of the user equipment) and is a value chosen by the user equipment in the given range of $P_{CMAX\_L}$ and $P_{CMAX\_H}$ based on the following constraints:

$$P_{CMAX\_L} \leq P_{CMAX} \leq P_{CMAX\_H}$$

$$P_{CMAX\_L} = \min(P_{EMAX} - \Delta T_C, P_{PowerClass} - \text{MPR} - \text{AMPR} - \Delta T_C)$$

$$P_{CMAX\_H} = \min(P_{EMAX}, P_{PowerClass})$$

$P_{EMAX}$ is the value signaled by the network and $\Delta T_C$, MPR and AMPR (also denoted A-MPR—Additional Maximum Power Reduction) are specified in 3GPP TS 36.101, available at http//www.3gpp.org and incorporated herein by reference.

MPR is a power reduction value used to control the adjacent channel leakage power ratio (ACLR) associated with the various modulation schemes and the transmission bandwidth.

A-MPR is the additional maximum power reduction. It is band specific and it is applied when configured by the network. Therefore, $P_{cmax}$ is UE implementation specific and hence not known by eNB.

Uplink Power Control for Carrier Aggregation

One main point of UL Power control for LTE-Advance is that a component carrier specific UL power control is supported, i.e. there will be one independent power control loop for each UL component carrier configured for the user equipment. Furthermore, power headroom is reported for every component carrier.

Furthermore, in LTE Rel. 10 within the scope of carrier aggregation there are two maximum power limits, a total maximum UE transmit power $P_{CMAX}$ and a component carrier-specific maximum transmit power $P_{CMAX,c}$. 3GPP RAN4 working group already indicated that both (nominal) maximum transmit power per user equipment $P_{CMAX}$ and the (nominal) maximum component carrier-specific transmit power $P_{CMAX,c}$ should be the same regardless of the number of carriers supported, in order not to affect the link budget of a carrier aggregation capable user equipment in the single carrier operation mode. RAN1 agreed that a power headroom report, which is reported for every component carrier, accounts for the maximum power reduction (MPR); in other words, the power reduction applied by the user equipment is taken into account in the component carrier specific maximum transmission power $P_{CMAX,c}$, where c denotes the component carrier.

Furthermore and different to Rel-8/9, for LTE-A the UE has also to cope with simultaneous PUSCH-PUCCH transmission, multi-cluster scheduling, and simultaneous transmission on multiple component carriers, which requires larger MPR values and also causes a larger variation of the applied MPR values compared to Rel-8/9.

It should be noted that the eNB does not have knowledge of the power reduction applied by the UE on each component carrier, since the actual power reduction depends on the type of allocation, the standardized MPR value and also on the UE implementation. Therefore, eNB doesn't know the component carrier specific maximum transmission power relative to which the UE calculates the power headroom. In Rel-8/9 for example UE's maximum transmit power $P_{CMAX}$ can be within some certain range as described above.

$$P_{CMAX\_L} \leq P_{CMAX} \leq P_{CMAX\_H}$$

Due to the reduction of the component carrier-specific maximum transmission power $P_{CMAX,c}$, which is not known to eNodeB as explained above, the eNodeB would not really know how close a user equipment is operating to its total maximum transmission power $P_{CMAX}$. Therefore, there might be situations where a user equipment is exceeding the total user equipment maximum transmission power $P_{CMAX}$ which would hence require power scaling. FIG. 8 shows an exemplary scenario where user equipment is power limited, i.e. applying power scaling on component carriers CC#1 and CC#2 configured in the uplink. Even though the user equipment is power limited, the component carrier-specific power headroom reports according to the LTE definitions of Rel-8/9 indicate sufficiently large power headroom.

Due to the fact that the power reduction applied by the UE to the maximum transmit power of a component carrier is not known by eNB, it was agreed to introduce in Rel-10 a new power headroom MAC control element, which is also referred to as extended power headroom MAC control element. The main difference to the Rel-8/9 PMR MAC CE format, is that it includes a Rel-8/9 power headroom value for each activated uplink component carrier and is hence of variable size.

Furthermore, it not only reports the power headroom value for a component carrier but also the corresponding $P_{CMAX,c}$ (maximum transmit power of component carrier with the index c) value. In order to account for simultaneous PUSCH-PUCCH transmissions, the user equipment reports for the PCell the Rel-8/9 power headroom value which is related to PUSCH-only transmissions (referred to type 1 power headroom) and if the UE is configured for simultaneous PUSCH-PUCCH transmission, a further Power headroom value, which considers PUCCH and PUSCH transmissions, also referred to as type 2 power headroom. FIG. 9 discloses the extended power headroom MAC control element, including the type 2 power headroom information.

The fields in the extended power headroom MAC Control Element are defined as follows:
Ci: this field indicates the activation/deactivation status of the SCell with Cell Index i. The Ci field set to "1" indicates that a PH field for the SCell with Cell Index i is reported. The Ci field set to "0" indicates that a PH field for the SCell with Cell Index is not reported;
R: reserved bit, set to "0":
V: this field indicates if the PH value is based on a real transmission or a reference format. For Type 1 PH, V=0 indicates real transmission on PUSCH and V=1 indicates that a PUSCH reference format was used. For Type 2 PH, V=0 indicates real transmission on PUCCH and V=1 indicates that a PUCCH reference format was used;
Power Headroom (PH): this field indicates the power headroom level. The length of the field is 6 bits. The reported PH and the corresponding power headroom levels are shown in Table 6.1.3.6-1 of standard 36.321. [FFS: If the corresponding V=1, the octet containing the PCMAX,c field is omitted]:
PCMAX,c: this field contains the PCMAX,c used for calculation of the preceding PH field.

When a power headroom report is triggered, the UE transmits the extended power headroom MAC control element in an uplink resource on any one of the available uplink PCell and SCells. On which component carrier the ePHR is transmitted, depends on the received uplink grant and the trigger to report the power headroom.

Further details of the extended power headroom MAC control element can be found in section 6.1.3.6a of standard TS 36.321 incorporated herein by reference.

Problems of Prior Art

As explained above, the extended power headroom reporting according to Release-10 is different to that of Release 8/9. As apparent, from FIGS. 7 and 9, one difference is that the extended power headroom MAC control element size is variable, e.g. depends on the number of activated component carrier and depends on whether the user equipment is configured for simultaneous PUSCH-PUCCH transmissions (i.e. power headroom MAC CE includes type 2 power headroom for PCell). Additionally, the size of the extended power headroom MAC control element (see FIG. 9) is significantly larger than the normal power headroom MAC control element (see FIG. 7).

A normal power headroom MAC control element as defined by Rel-8/9 is only 1 byte. Assuming that a user equipment is configured with simultaneous PUSCH-PUCCH transmissions and has two activated uplink component carriers, the size of the ePHR MAC control element is 7 bytes.

Semi-persistent scheduling was designed mainly for Voice over IP applications, which have certain characteristics: the packets are small, have equal size and arrive in periodic intervals. Therefore, the resource allocations assigned for semi-persistent scheduling are generally small. In Release 8/9 the transport block (TB) size table is optimized for the most prominent Voice Codecs, i.e. certain entries in the TB-size table are defined for an efficient semi-persistent scheduling support.

The following Table 4 discloses transport block sizes optimized for different voice codecs in NarrowBand (NB) and WideBand (WB), i.e. depending on different Adaptive Multi-Rates (AMR).

TABLE 4

| NB-AMR | TB size (bits) | WB-AMR | TB size (bits) |
|---|---|---|---|
| 4.75 kbps | 176 | 6.6 kbps | 208 |
| 5.90 kbps | 192 | 8.85 kbps | 256 |
| 7.40 kbps | 224 | 12.65 kbps | 328 |
| 12.2 kbps | 320 | | |
| SID | 144 | | |

For instance, voice data encoded with 12.2 kbps in narrowband is transmitted with a transport block size of 320 bits, wherein the 320 bits include 16 bits for a short buffer status report or a power headroom report, thus having a VoIP packet of 304 bits (including protocol headers). Both of the two MAC control elements (short BSR and PHR) have a size of one octet plus one byte for the corresponding MAC subheader. In particular, those transport block sizes are chosen based on the corresponding number of speech frame bits as RTP payload using the bandwidth-efficient payload format for AMR. In addition, the 320 bits include 3 octets of ROHC (Robust Header Compression) header, 3 octets for MAC/RLC/PDCP headers and 2 additional octets to handle small variations in the ROHC header size and/or L2 header size (e.g. short BSR, PHR). Therefore, 64 bits are used for overhead, the remaining 256 bits are VoIP payload. The same applies to the transport block size of 328 bits, where 264 bits are VoIP payload (RTP payload), 64 bits are Protocol and control signalling overhead.

The following Table 5 is a transport block size table which is used to determine the transport block size depending on the resource block size $N_{PRB}$ and the transport block size index $I_{TBS}$ (1-26) according to Rel-8/9. The transport block size index $I_{TBS}$ is instructed by the MCS index, as can be seen from Tables 1 and 2.

MAC control element (256 bits VoIP data+64 bits header etc.+8 bits padding; 264 bits VoIP data+64 bits header etc.).

It should be also noted that a MAC control element for PHR or ePHR has a higher priority during the logical channel prioritization procedure than data of a logical channel (except for UL-CCCH). In other words, the MAC control element for the ePHR/PHR is first included in the uplink transport block; the remaining bits are allocated to the logical channels, i.e. the VoIP data.

The above changes significantly for extended power headroom reporting according to Release 10 of LTE. Basically, the transport size table optimized for Rel-8/9 VoIP is no longer optimized for Release 10, because the size of the extended power headroom report increases and is variable. For instance, a 328 bits allocation doesn't allow for a transmission of a VoIP packet (12.2 kpbs or 12.65 kbps) and an extended power headroom report, due to the extended power headroom report having more than 8 bits (minimum of ePHR MAC CE is 24 bits). Therefore, the ePHR MAC CE and the MAC subheader have at least 32 bits.

The transport block sizes for semi-persistent scheduling are fixed for a particular time, e.g. the transport block size

TABLE 5

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

The above Table 5 is only presented for those resource block sizes that are relevant for the discussion of the invention, i.e. for resource block sizes 1-10. As can be seen from Table 5, there are certain transport block sizes which are supported for a large number of resource block allocation, e.g. 328 bits (bold and underlined) can be allocated for resource block sizes 1-6, 8-9. Similarly, transport block sizes 176, 208, 224 and 256 are also present in Table 5 for several resource block sizes. As can be seen, these transport block sizes coincide with those optimized for particular voice codecs, i.e. Adaptive Multi-Rates, according to Table 4.

For instance, the transport block size of 328 bits allows for the transmission of a VoIP packet of a 12.2 kbps NB-AMR codec or a 12.65 kbps WB-AMR codec, and a PHR MAC control element or alternatively a short BSR of 328 bits is set to be used. Therefore, in case the user equipment needs to transmit an ePHR MAC control element in a TTI (e.g. subframe) where it has been allocated a semi-persistent uplink resource for VoIP uplink data, the UE can only transmit e.g. 328 bits in the uplink for said subframe. Due to logical channel prioritization, the transport block is first "filled" with the ePHR MAC control element, which can be e.g. 7 bytes long. Considering the 64 bits of control information (ROHC/MAC/RLC/PDCP header), the remaining 208 bits of the 328 bit transport block can be used for the VoIP data, which however is e.g. 256 or 264 bit long (for 12.2 respectively 12.65 kbps).

Consequently, the VoIP data cannot be transmitted in the same grant. The MAC layer signals this to the RLC layer which performs the RLC segmentation of the RLC SDU (see FIG. 5) to generate an RLC PDU having the appropriate size to be transmitted in the remaining bits of the MAC PDU (i.e. transport block).

RLC segmentation should be in general avoided since it increases the delay of a data packet transmission as well as the PDCCH overhead, i.e. for the transmission of the remainder of the RLC SDU. RLC segmentation of VoIP packets is disadvantageous since there is a strict delay requirement for VoIP services.

RLC segmentation could be avoided by using a larger transport block size from the transport block size table 5 above, e.g. 392 bits instead of 328 bits. However, by this the VoIP capacity would be significantly reduced, i.e. the system can support only less number of VoIP users than before for the Rel-8/9 case. Also it should be noted that in subframes where no extended power headroom report is triggered and hence only a VoIP packets is transmitted on the persistently allocated uplink resource, padding would be used in order to fill the larger transport block, e.g. 392 bits instead of 328 bits. Another disadvantage of allocating a larger transport block size for VoIP applications, e.g. 392 bits, would be a reduced scheduling flexibility for retransmissions, since there are less 392 bit entries in transport block size table.

The definition of a new transport block size table for Rel-10, considering the extended power headroom reporting, is difficult, since the extended power headroom report is variable; thus, the transport block size table would not be optimized for all possible ePHR MAC control element sizes. Furthermore a Rel-10 UE would need to support multiple transport block size tables in order to support basic (Rel-8/9 PHR MAC control element) power headroom reporting and extended power headroom reporting, which increases the complexity.

SUMMARY OF THE INVENTION

One object of the invention is to provide an improved method for transmitting power headroom information from a user equipment to a base station; in particular, when using a persistently-allocated uplink resource to transmit said power headroom information.

The object is solved by the subject matter of the independent claims. Advantageous embodiments of the invention are subject-matters of the dependent claims.

According to a first aspect of the invention, the power headroom information reporting depends on how the uplink resource, on which the power headroom is to be transmitted, is scheduled. In other words, the power headroom reporting according to the first aspect of the invention is scheduling-mode dependent. What kind of power headroom information is transmitted to the base station depends on the user equipment, and in particular on whether the user equipment supports extended power headroom reporting or merely basic power headroom reporting.

The basic headroom reporting provides considerably less information than the extended headroom reporting. The basic power headroom reporting provides information on the available transmit power for one component carrier. On the other hand, the extended power headroom reporting provides information about the available transmit power and the corresponding maximum transmit power for each activated uplink component carrier.

It is assumed that the user equipment supports the transmission of extended power headroom information; furthermore, the user equipment is also configured by a base station to transmit extended power headroom information. According to the first aspect of the invention, the configuration to transmit an extended power headroom report is not effective for uplink resources that are scheduled semi-persistently. Put differently, when power headroom information is to be transmitted using a persistently allocated uplink resource, then no extended power headroom report is transmitted but a basic (normal) power headroom report.

In more detail, whenever the user equipment is triggered to transmit power headroom information (e.g. because of a significant change in the estimated path loss since the last power headroom report), the user equipment will transmit power headroom information for the next uplink resource. According to the first aspect of the invention, the user equipment first determines how the uplink resource was allocated for the user equipment. Basically, there are two different possibilities how an uplink resource is allocated: dynamically and persistently.

When the uplink resource is scheduled dynamically, then the user equipment can transmit the extended power headroom report to the base station as configured using said dynamically allocated uplink resource.

When the uplink resource is scheduled persistently (as e.g. within a semi-persistent scheduling configuration), then the user equipment shall transmit the basic power headroom report to the base station using said persistently allocated uplink resource. This is done by the user equipment, in spite of actually being configured to transmit extended power headroom information.

By transmitting the basic power headroom report in persistently allocated uplink resources and transmitting the extended power headroom report in dynamically allocated uplink resources, no data delay is introduced. In particular, the transport block is capable of comprising the (voice) data and the basic power headroom report, and thus the (voice data) does not need to be segmented and is not delayed.

According to a second aspect of the invention, uplink data is prioritized over extended power headroom information for uplink resources that are scheduled persistently. More specifically, it is assumed again that a user equipment is configured to transmit extended power headroom information and is triggered such that it is to transmit the extended power headroom information using an uplink resource that is persistently scheduled. In order to make sure that the (voice) uplink data is not delayed due to the extended power headroom information, the uplink data is prioritized over the power headroom information.

As explained in the background section, due to the logical channel prioritization procedure, the transport block of the persistently-scheduled uplink is filled first with the extended power headroom information and then with the uplink data. Since the extended power headroom information is large the uplink data is segmented and cannot be transmitted completely within the transport block. To avoid the resulting delay, and furthermore the additional PDCCH overhead in order to schedule the remaining part of the segmented data packet, the second aspect of the invention suggests defining an additional prioritization rule in the logical channel prioritization procedure that prioritizes any uplink data over extended power headroom information for uplink resource assignments that are persistently scheduled. Alternatively, the additional prioritization rule for the logical channel prioritization procedure only prioritizes voice uplink data over the extended power headroom information, since voice data is time critical and delays should be avoided.

Alternatively, the prioritization of the uplink data over extended power headroom reporting is not implemented into the logical channel prioritization procedure, but differently.

Namely, it is determined whether the size of the transport block is large enough to include the extended power headroom report and the uplink data. In case the size of the transport block is not large enough, the extended power headroom report is not included in the transport block, but only the uplink data. The present invention provides a method for The present invention provides a method for transmitting power headroom information from a user equipment to a base station in an uplink resource. The power headroom information is either a basic power headroom report or an extended power headroom report. The user equipment is configured to report the power headroom information with extended power headroom reports. In case the uplink resource is scheduled via a persistent scheduling configuration, a basic power headroom report is transmitted as power headroom information to the base station in the uplink resource. In case the uplink resource is scheduled via a dynamic scheduling, an extended power headroom report is transmitted as power headroom information to the base station in the uplink resource.

According to an advantageous embodiment of the invention which can be used in addition or alternatively to the above, it is determined whether the uplink resource for transmitting the power headroom information is scheduled via a persistent scheduling configuration or via a dynamic scheduling.

According to an advantageous embodiment of the invention which can be used in addition or alternatively to the above, the basic power headroom report provides information on the available transmit power for one component carrier. Furthermore, the extended power headroom report provides information about the available transmit power and the corresponding maximum transmit power for each activated uplink component carrier.

According to an advantageous embodiment of the invention which can be used in addition or alternatively to the above, the basic power headroom report comprises information on a power headroom level for one component carrier. Furthermore, the extended power headroom report comprises information on a power headroom level for each activated uplink component carrier and comprises information on a component carrier-specific maximum transmission power for each activated component carrier, and if an uplink shared channel transmission and an uplink control channel transmission is performed simultaneously, comprises a power headroom level which considers the uplink shared channel transmission and the uplink control channel transmission.

According to an advantageous embodiment of the invention which can be used in addition or alternatively to the above, the transmission of an extended power headroom report is triggered in the user equipment, in case the basic power headroom report is transmitted in the uplink resource. The triggered extended power headroom report is transmitted from the user equipment to the base station in the next possible uplink resource.

According to an advantageous embodiment of the invention which can be used in addition or alternatively to the above, the transmission of an extended power headroom report is triggered in the user equipment, in case the basic power headroom report is transmitted in the uplink resource. The triggered extended power headroom report is transmitted from the user equipment to the base station in the next possible uplink resource that is scheduled via a dynamic scheduling.

According to an advantageous embodiment of the invention which can be used in addition or alternatively to the above, a prohibition timer is used to prohibit the transmission of second power headroom information for a particular time after transmitting first power headroom information. The prohibition timer is ignored for the triggered extended power headroom report.

According to an advantageous embodiment of the invention which can be used in addition or alternatively to the above, the prohibition timer is not restarted after transmitting the triggered extended power headroom report.

The present invention further provides a method for transmitting an extended power headroom report from a user equipment to a base station. The extended power headroom report and uplink data are to be transmitted in an uplink resource. In case the uplink resource is scheduled via a persistent scheduling configuration, the uplink data is prioritized over the extended power headroom report when generating the transport block, such that all the uplink data is included in the transport block.

According to an advantageous embodiment of the invention which can be used in addition or alternatively to the above, the uplink data is Voice over IP data, and the prioritizing prioritizes Voice over IP uplink data over the extended power headroom report.

According to an advantageous embodiment of the invention which can be used in addition or alternatively to the above, the prioritizing prioritizes logical channels during a logical channel prioritization procedure, and the uplink data is prioritized for being transmitted using a particular logical channel.

According to an advantageous embodiment of the invention which can be used in addition or alternatively to the above, it is determined whether the size of the transport block is large enough to include the extended power headroom report and the uplink data. In case the size of the transport block is not large enough, the extended power headroom report is not included in the transport block.

According to an advantageous embodiment of the invention which can be used in addition or alternatively to the above, another extended power headroom report is transmitted in the next possible uplink resource.

The present invention further provides a user equipment for transmitting power headroom information to a base station in an uplink resource. The power headroom information is either a basic power headroom report or an extended power headroom report. The user equipment is configured to report the power headroom information with extended power headroom reports. A transmitter of the user equipment transmits a basic power headroom report as power headroom information to the base station in the uplink resource, in case the uplink resource is scheduled via a persistent scheduling configuration. The transmitter transmits san extended power headroom report as power headroom information to the base station in the uplink resource, in case the uplink resource is scheduled via a dynamic scheduling.

According to an advantageous embodiment of the invention which can be used in addition or alternatively to the above, a processor of the user equipment determines whether the uplink resource for transmitting the power headroom information is scheduled via a persistent scheduling configuration or via a dynamic scheduling.

According to an advantageous embodiment of the invention which can be used in addition or alternatively to the above, the basic power headroom report provides information on the available transmit power for one component carrier, and the extended power headroom report provides information about the available transmit power and the corresponding maximum transmit power for each activated uplink component carrier. In more detail, the basic power headroom report comprises information on a power headroom level for one component carrier, and the extended power headroom report comprises information on a power headroom level for each activated uplink component carrier and comprises information on a component carrier-specific maximum transmission power for each activated component carrier, and if an uplink shared channel transmission and an uplink control channel transmission is performed simultaneously, comprises a power headroom level which considers the uplink shared channel transmission and the uplink control channel transmission.

According to an advantageous embodiment of the invention which can be used in addition or alternatively to the above, the processor triggers the transmission of an extended power headroom report in the user equipment, in case the basic power headroom report is transmitted in the uplink resource. Further, the transmitter transmits the triggered extended power headroom report from the user equipment to the base station in the next possible uplink resource. In a more detailed embodiment the next possible uplink resource is scheduled via a dynamic scheduling.

According to an advantageous embodiment of the invention which can be used in addition or alternatively to the above, a prohibition timer is used to prohibit the transmission of second power headroom information for a particular time after transmitting first power headroom information. The prohibition timer is ignored for the triggered extended power headroom report. Further, the prohibition timer is not restarted after transmitting the triggered extended power headroom report.

The present invention provides a user equipment for transmitting an extended power headroom report to a base station. The extended power headroom report and uplink data are to be transmitted in an uplink resource. A processor of the user equipment prioritizes the uplink data over the extended power headroom report when generating the transport block, such that all the uplink data is included in the transport block, in case the uplink resource is scheduled via a persistent scheduling configuration.

According to an advantageous embodiment of the invention which can be used in addition or alternatively to the above, the uplink data is Voice over IP data, and the prioritizing prioritizes Voice over IP uplink data over the extended power headroom report.

According to an advantageous embodiment of the invention which can be used in addition or alternatively to the above, the processor prioritizes logical channels during a logical channel prioritization procedure, and the uplink data is prioritized for being transmitted using a logical channel.

According to an advantageous embodiment of the invention which can be used in addition or alternatively to the above, the processor determines whether the size of the transport block is large enough to include the extended power headroom report and the uplink data. The processor does not include the extended power headroom report in the transport block in case the size of the transport block is not large enough.

According to an advantageous embodiment of the invention which can be used in addition or alternatively to the above, a transmitter of the user equipment transmits another extended power headroom report in the next possible uplink resource.

This will become clearer in connection with the embodiments of the invention explained in the detailed description.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to the LTE-Advanced (LTE-A) mobile communication system discussed in the Technical Background section above. It should be noted that the invention may be advantageously used for example in connection with a mobile communication system such as the LTE-Advanced communication system previously described, but the invention is not limited to its use in this particular exemplary communication network.

The explanations given in the Technical Background section above are intended to better understand the mostly LTE-Advanced specific exemplary embodiments described herein and should not be understood as limiting the invention to the described specific implementations of processes and functions in the mobile communication network. Nevertheless, the improvements proposed herein may be readily applied in the architectures/systems described in the Technical Background section and may in some embodiments of the invention also make use of standard and improved procedures of theses architectures/systems.

Figure 7:
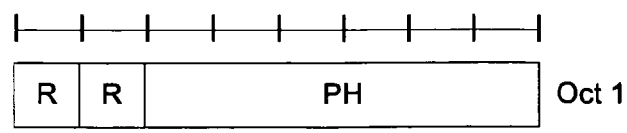
FIG. 7 shows the format of a MAC control element for reporting a power headroom for a component carrier.
Figure 8:
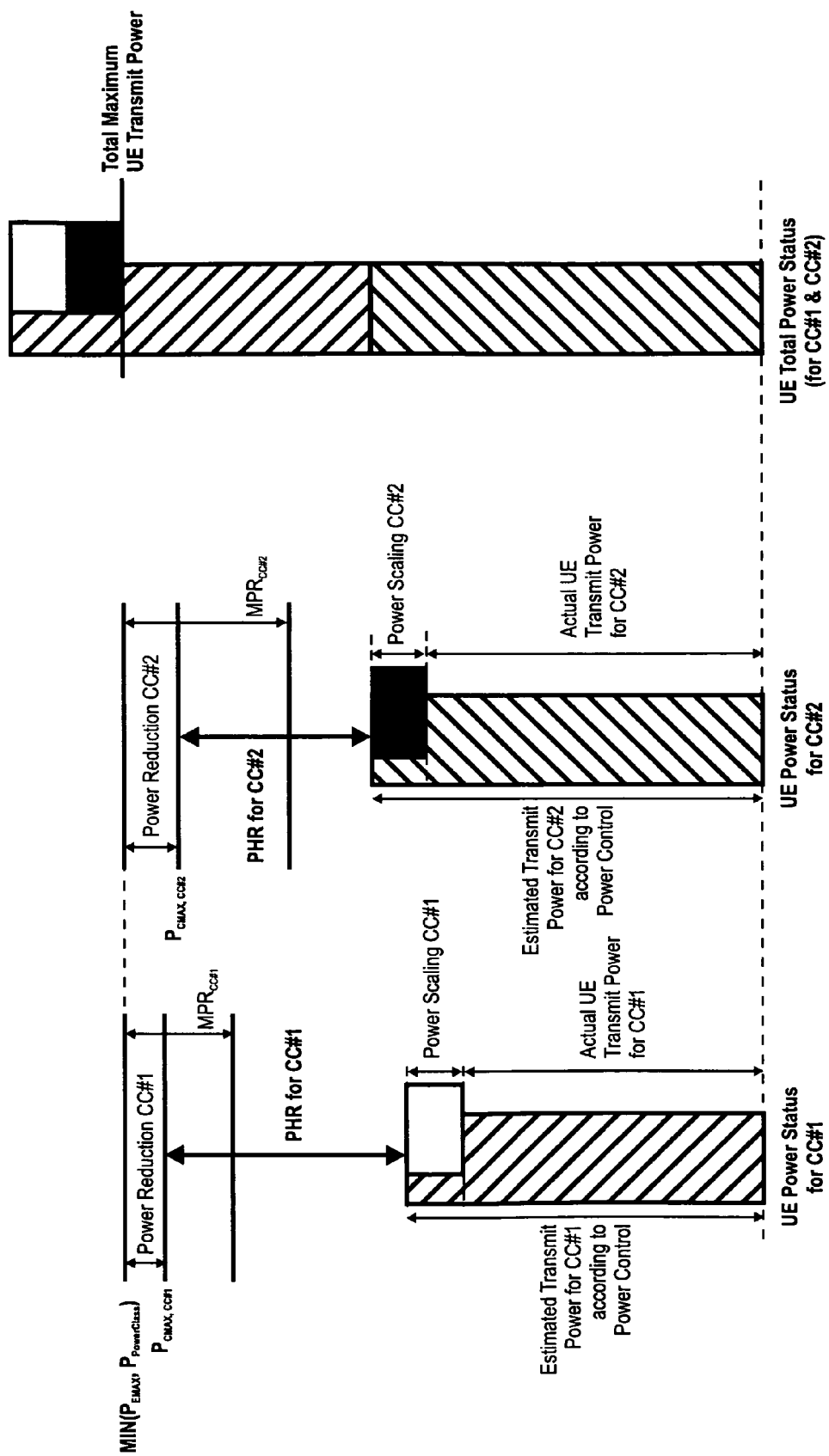
FIG. 8 shows an exemplary scenario where a user equipment is power limited, i.e. is applying power scaling on component carriers CC#1 and CC#2 configured in the uplink.

The term "basic power headroom report" as used in the present invention is to be understood as a power headroom report as defined by the Release 8/9 standard of LTE. In particular, a "basic power headroom report" reports a power headroom level for one component carrier, as exemplary depicted in FIG. 7. The term "basic" in said connection merely is used to make a contrast to the "extended" power headroom reporting.

Figure 9:
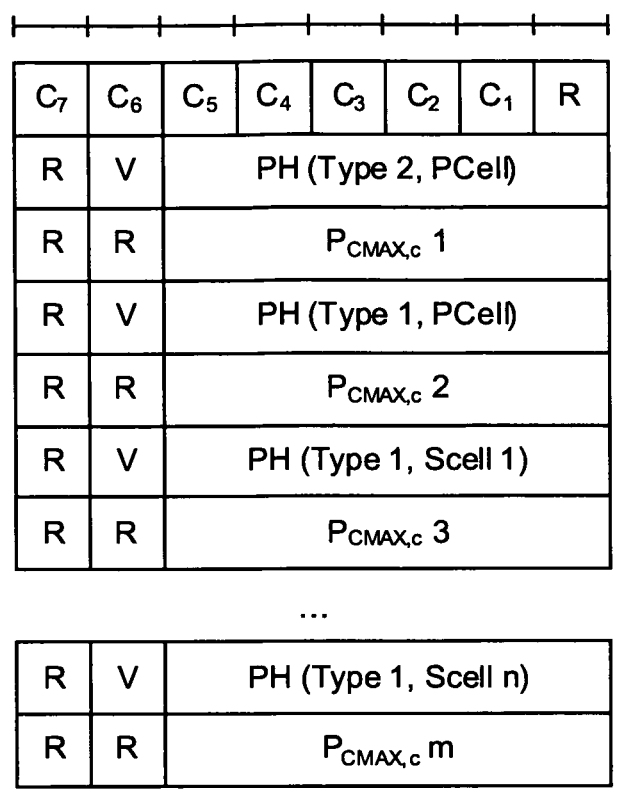
FIG. 9 shows the extended power headroom MAC control element, including the type 2 power headroom information.

The term "extended power headroom report" as used in the present invention is to be understood as a power headroom report as newly and additionally defined by the Release 10 standard of LTE. In particular, an "extended power headroom report" reports the information as exemplary depicted in FIG. 9.

The term "semi-persistent scheduling" as used in the present invention is to be understood as a type of scheduling which is not dynamic but persistent, i.e. where the resource is already pre-defined therefore not needing a dynamic scheduling grant. "Semi-persistent scheduling" is widely known to the skilled person and includes persistent uplink resource allocations for the first transmission of data packets, while using dynamic uplink resource allocation for re-transmissions of the data packets.

The term "persistent scheduling" as used in the present invention is closely related to the above-described "semi-persistent scheduling". In particular, the first transmission in a "semi-persistent scheduling configuration" is scheduled via a persistent scheduling. A persistent allocation is not dynamically controlled by the base station for every uplink resource, but is allocated according to a pre-defined configuration, which is valid for a particular time (until otherwise instructed). In the current standardization, persistent scheduling is part of "semi-persistent scheduling", but this is not necessary and in the future a "persistent scheduling" may be defined separately.

The present invention allows to mitigate the problems explained at the end of the background section, in particular that the extended power headroom reporting according to Release 10 of LTE, when being transmitted in a semi-persistently scheduled uplink resource, causes delays in transmitting the uplink data.

First Aspect

According to a first aspect of the invention, the power headroom reporting is made dependent on the type of scheduling for the uplink resource in which the power headroom information is to be transmitted. In short, when a power headroom report is triggered in the user equipment, it is first determined whether the corresponding uplink resource is scheduled through a dynamic grant from the base station or through a persistent allocation, i.e. also referred to as a configured uplink grant. Normally, the user equipment, which is assumed to be configured for transmitting extended power headroom information, will transmit an extended power headroom report. However, when the uplink resource is persistently scheduled, then this configuration is ignored by the user equipment, and a basic (not extended) power headroom report is transmitted to the base station using said persistently allocated uplink resource. In all other cases, the user equipment follows the configuration and transmits extended power headroom reports to the base station.

In more detail, the following scenario is assumed. A user equipment according to Release 10 supports extended power headroom reporting and normal Rel. 8/9 power headroom reporting. The base station wants to take advantage of the additional information provided by the extended power headroom reporting and configures the user equipment to transmit extended power headroom information. It should be noted that the base station can configure a user equipment whether to report a "basic" normal or a extended power headroom. This configuration may be done by higher layer signalling, i.e. radio resource control (RRC) signalling.

Furthermore, the user equipment is assumed to run a Voice over IP application and thus has a semi-persistent scheduling configuration by the base station. In other words, uplink resources for initial transmissions are configured persistently by the base station for transmitting the uplink voice data by the user equipment; the user equipment applies this configuration and thus transmits uplink voice data every pre-determined subframes to the base station.

Figure 10:
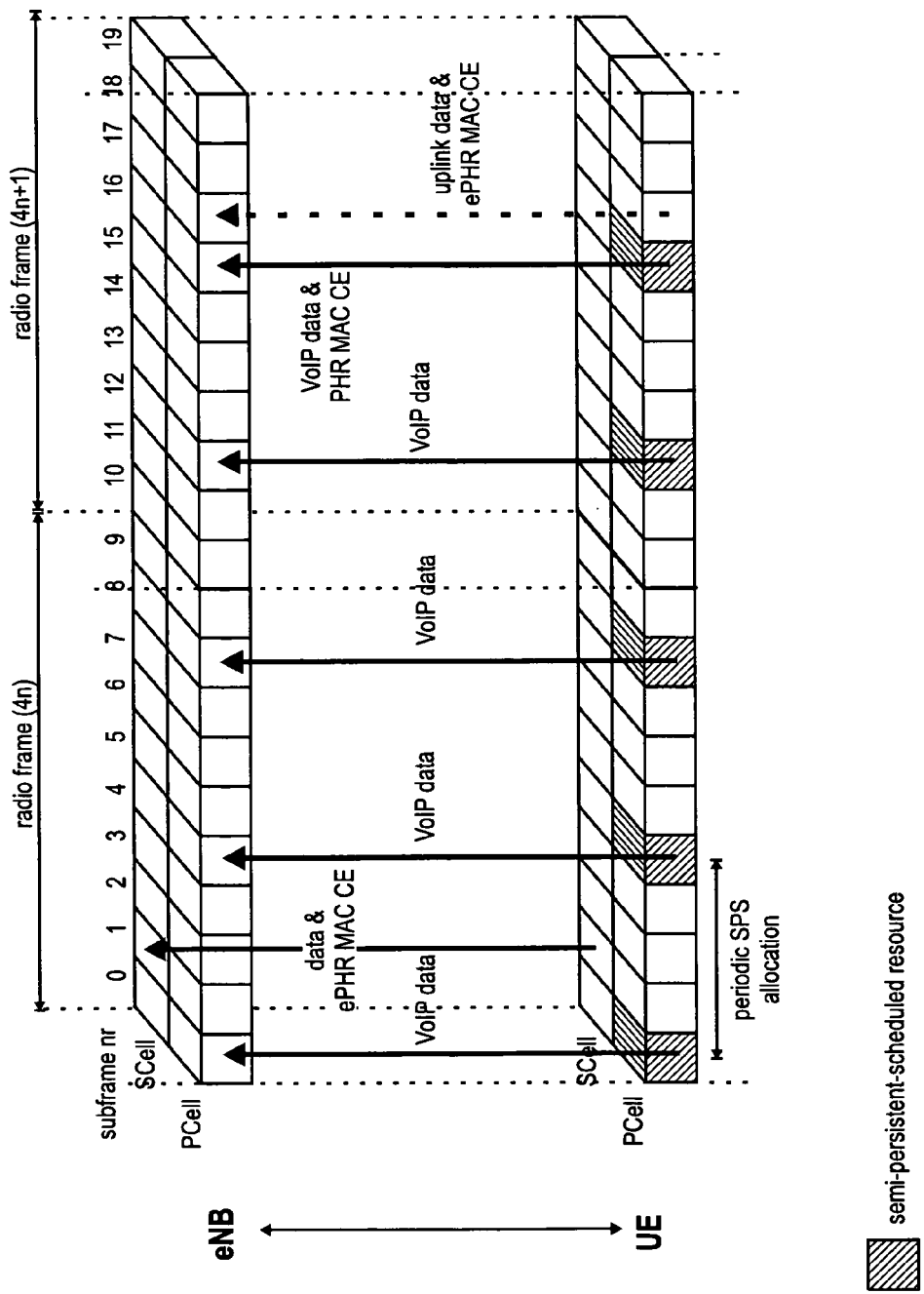
FIG. 10 is a diagram illustrating the communication channels and their subframes between the user equipment and the eNodeB, including the transmission of power headroom information depending on the type of scheduling according to the first aspect of the invention.

FIG. 10 is a diagram illustrating the component carriers and their subframes between the user equipment and the eNodeB (base station). As apparent from FIG. 10, in order to explain the exemplary embodiment of the invention, it is assumed that carrier aggregation is used between the eNodeB and the user equipment; a PCell and one SCell are configured.

Though the embodiments of the present invention are described in connection with a communication over two component carriers (PCell and SCell), this should not be understood as restricting the scope of the invention. The embodiments of the present invention are applicable in a similar way when only one component carrier is configured or when several component carriers are used between the user equipment and the base station.

For the PCell, uplink resources are scheduled every 4 subframes based on a persistent allocation of a semi-persistent scheduling configuration. The particular periodicity of the persistent allocation, i.e. 4 subframes, is merely to be understood as an example and set to 4 for illustration purposes only. For instance, in VoIP applications 20 ms allocations are commonly used. The embodiments of the invention are applicable to any other periodicity of the persistent allocation.

In the scenario as depicted in FIG. 10, power headroom reporting is triggered twice, for subframe 1 and subframe 16. For subframe 1, the user equipment has a dynamic uplink resource allocation for the SCell, and the power headroom information is thus to be transmitted in the dynamically allocated uplink resource of subframe 1 in the SCell. The main scenario is that power headroom reporting is triggered in a TTI (subframe) where the user equipment has only an uplink semi-persistent scheduling allocation in the PCell. Otherwise, in case there are additional dynamically allocated uplink resources in the same TTI on the SCell, the user equipment can include the extended power headroom report in the dynamically scheduled uplink resource, in which case there would be no problem with regard to the segmentation of VoIP packets on the PCell. Namely, the VoIP packet is transmitted on the uplink resource which is scheduled persistently, and the extended power headroom report MAC control element is transmitted on the uplink resource on the SCell which is dynamically scheduled.

Figure 11:
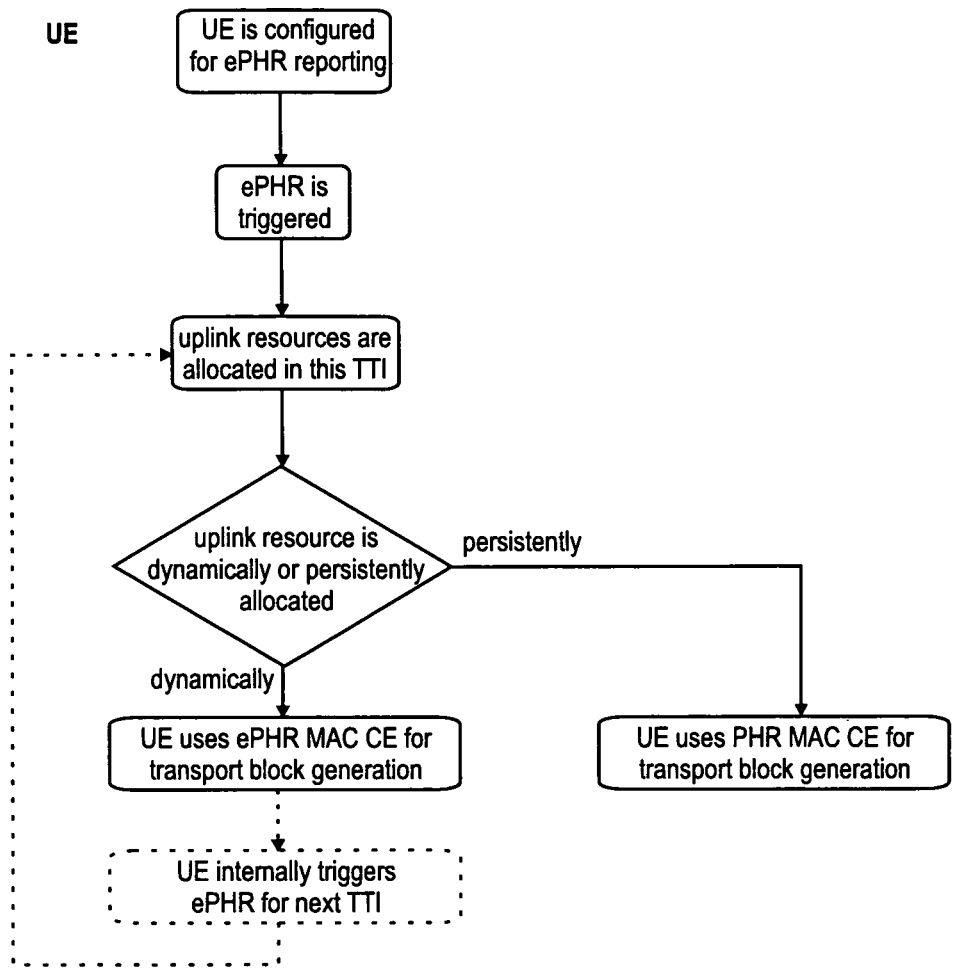
FIG. 11 is a flow diagram illustrating the procedure of transmitting by the user equipment power headroom information to the eNodeB depending on the type of scheduling for the uplink resource according to the first aspect of the invention.

FIG. 11 is a flow diagram for the user equipment and in particular for the procedure of transmitting power headroom information to the base station according to the first aspect of the invention. FIG. 11 discloses the steps of configuring the UE for reporting extended power headroom information, and the triggering of power headroom reporting. In the next step, the user equipment determines that uplink resources are allocated in the present transmission time interval (TTI; usually one subframe).

For subframe 1 the user equipment determines that the uplink resource of subframe 1 is dynamically scheduled, i.e. the base station transmitted an uplink grant allocation message over the PDCCH to the user equipment (not shown in FIG. 10) for transmitting uplink data. Correspondingly, the user equipment will transmit the extended power headroom information to the base station.

In more detail, the user equipment generates a MAC control element including extended power headroom information, and includes the generated ePHR MAC control element in the transport block. Furthermore, the user equipment fills the transport block with other data which is pending for being transmitted in the uplink.

For the power headroom reporting in subframe 16, the user equipment will learn that the corresponding uplink resource is scheduled via a persistent scheduling (namely for transmitting voice data). According to the first aspect of the invention, the user equipment will then ignore the configuration for extended power headroom reporting and will transmit a Rel-8/9 basic power headroom report instead. Correspondingly, the user equipment will generate a PHR MAC control element, and generates the transport block by first inserting the PHR MAC control element and then the voice data.

A semi-persistent scheduling allocation can be overridden by a dynamic grant. In said case, the user equipment will determine that the uplink resource is scheduled via a dynamic scheduling and will report an extended PHR MAC control element if triggered. The eNodeB can schedule in that case a sufficiently large grant which allows the inclusion of the extended power headroom report and the VoIP packet.

The user equipment can determine the type of scheduling of an uplink resource in different ways. The user equipment is configured with persistent scheduling and can thus infer whether the uplink resource is scheduled as part of said persistent scheduling or whether the user equipment received previously an uplink grant from the base station in the PDCCH. Depending on the presence of a PDCCH the UE determines whether an uplink resource is persistently scheduled, i.e. also referred to as configured uplink grant, or whether the uplink resource is scheduled dynamically.

The base station expects to receive extended power headroom reporting from the user equipment, since it configured the user equipment in said way. The extended power headroom MAC control element and the normal Rel. 8/9 power headroom MAC control element have a different logical Channel ID in the MAC PDU subheader. Thus, the eNodeB can distinguish both MAC control elements based on the subheader.

One of the benefits of this whole procedure is that no new transport block size tables need to be introduced which are considering extended power headroom reporting in combination with semi-persistent scheduling; in other words, the same transport block size table as defined for Rel-8/9 can be used. Furthermore, the eNodeB can allocate the same transport block sizes for semi-persistent scheduling allocation as used in Rel. 8/9, which in turn means that the same VoIP capacity is supported also for Rel-10 when extended power headroom reporting is configured. Essentially, the semi-persistent scheduling operation will be the same as for Rel. 8/9 in connection with power headroom reporting.

Obviously, neither the uplink data nor the power headroom reporting is delayed; the power headroom is reported as soon as possible when triggered.

However, the Rel. 8/9 power headroom report does not provide the same level of information as the Rel. 10 extended power headroom report. As mentioned above and apparent from FIGS. 7 and 11, the extended power headroom reporting includes (in addition to the power headroom) the corresponding maximum transmit power of the component carrier, which essentially provides the eNodeB with information on the used power reduction (MPR/A-MPR) for the uplink transmission on this component carrier. Nevertheless, semi-persistent scheduling is only used on the PCell in Rel-10 and the allocated transport block sizes are in general small for semi-persistent scheduling. Therefore, the drawback of not providing the information on the used power reduction (MPR) for the semi-persistent scheduling allocation is not considered as significant, since knowledge of the used MPR is more crucial for higher data rates, i.e. large uplink resource allocations.

This drawback can be overcome by the following advantageous embodiment of the invention. When the user equipment transmits a Rel. 8/9 power headroom report instead of the extended power headroom report for a persistently allocated uplink resource, another (extended) power headroom report is implicitly triggered by the user equipment for transmission in the next available uplink resource. In correspondence therewith, the user equipment will transmit an extended power headroom report in the next possible uplink resource. This advantageous embodiment is also depicted in FIGS. 10 and 11 with dashed lines, to illustrate that the additional triggering of another power headroom report is optional and not essential.

In FIGS. 10 and 11 it is assumed that the user equipment has a dynamic scheduling in subframe 17 (being the next TTI), which can be used by the user equipment to transmit the extended power headroom report in the PCell. As apparent from FIG. 11, the user equipment will equally check the type of scheduling of the uplink resource of subframe 17, will then determine that subframe 17 is dynamically scheduled and then transmits the extended power headroom report together with any other pending uplink data.

In order to not delay the extended power headroom report, internally triggered by the user equipment, the prohibitPHR-timer operation is ignored for this additional ePHR sent in subframe 17. In other words, the ePHR is transmitted at the next uplink transmission opportunity (in this example subframe 17), irrespective of whether the prohibitPHR-timer is running.

Furthermore, the prohibitPHR-timer is advantageously not restarted at the transmission of this additional ePHR of subframe 17. This has the benefit that the implicitly triggered extended power headroom report has no impact on the normal power headroom reporting procedure, i.e. implicitly triggered extended power headroom does not delay next regular power headroom report according to power headroom related timers respectively triggers.

The above-explained advantageous embodiment of the invention ensures that the additional information from the extended power headroom report, i.e. Pcmax and PH type 2, is received by the eNodeB in the next possible uplink resource occasion.

The standard of LTE can thus be changed to consider the scheduling type of uplink resources when transmitting extended power headroom information. For instance:

if extendedPHR is configured and an uplink grant for this TTI has been configured, the UE shall obtain the value of the Type 1 power headroom from the physical layer and instruct the Multiplexing and Assembly procedure to generate and transmit a PHR MAC control element.

Second Aspect

According to a second aspect of the invention, uplink data is prioritized over extended power headroom information for uplink resources that are scheduled persistently.

This can be achieved in different ways. According to one embodiment of the invention the logical channel prioritization procedure is adapted as will be described in the following.

In particular, it is assumed again that a user equipment supports and is also configured to report extended power headroom information to the base station. When power headroom reporting is triggered and there is an uplink resource available, the user equipment will generate an extended power headroom report MAC control element. The uplink resource for which power headroom reporting was triggered is scheduled via a persistent allocation. The MAC layer will generate the corresponding transport block for transmitting the extended power headroom report together with the pending voice data. When generating the transport block the user equipment will perform the logical channel prioritization procedure.

Figure 1:
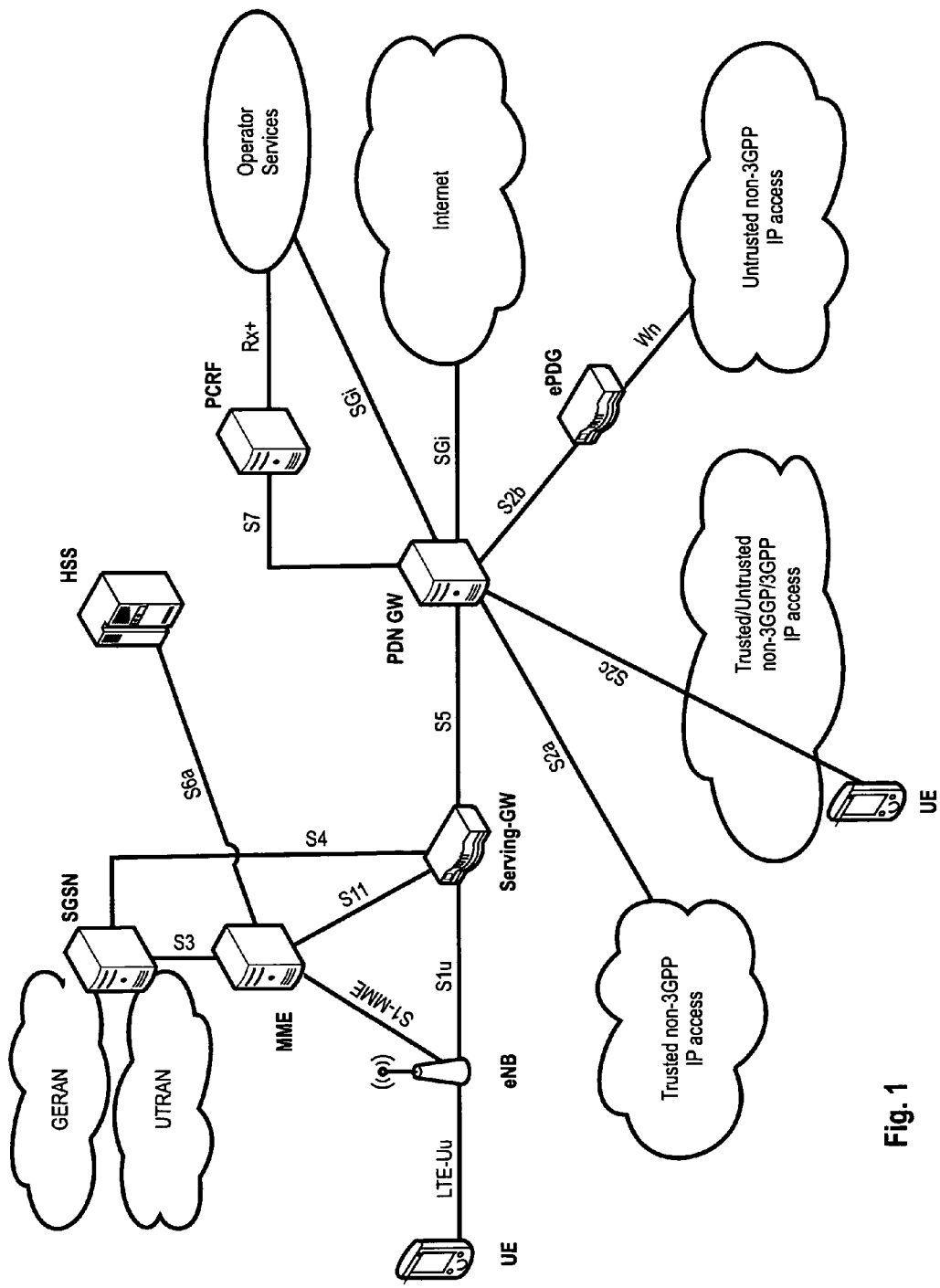
FIG. 1 shows an exemplary architecture of a 3GPP LTE system.
Figure 2:
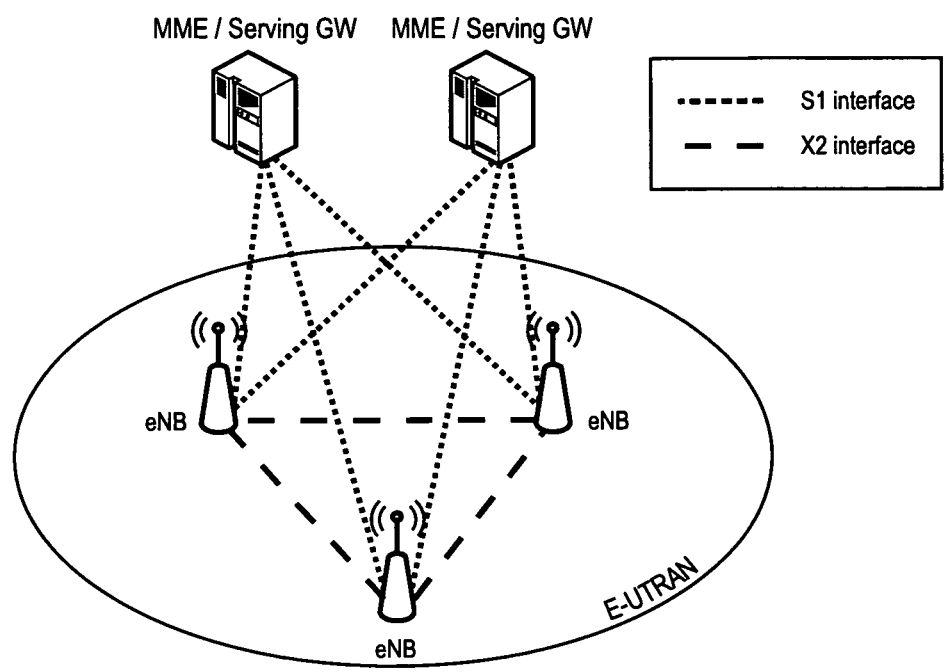
FIG. 2 shows an exemplary overview of the overall E-UTRAN architecture of 3GPP LTE.
Figure 3:
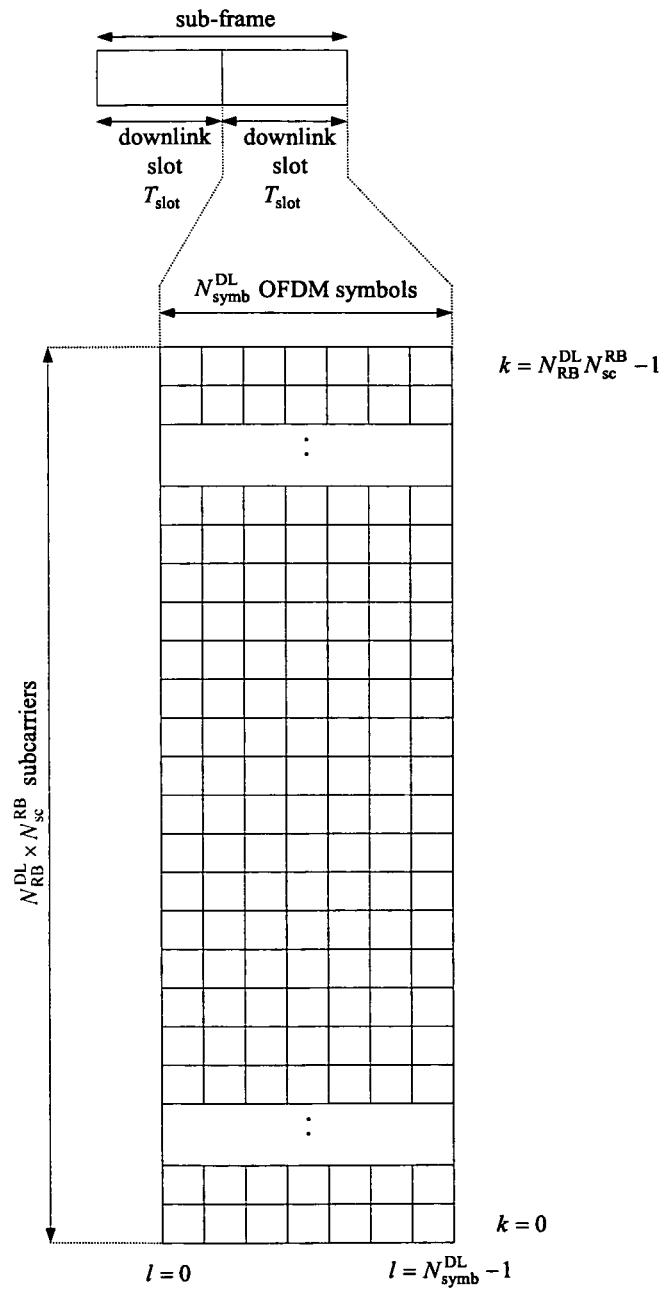
FIG. 3 shows an exemplary sub-frame structure on a downlink component carrier as defined for 3GPP LTE (Release 8/9)
Figure 4:
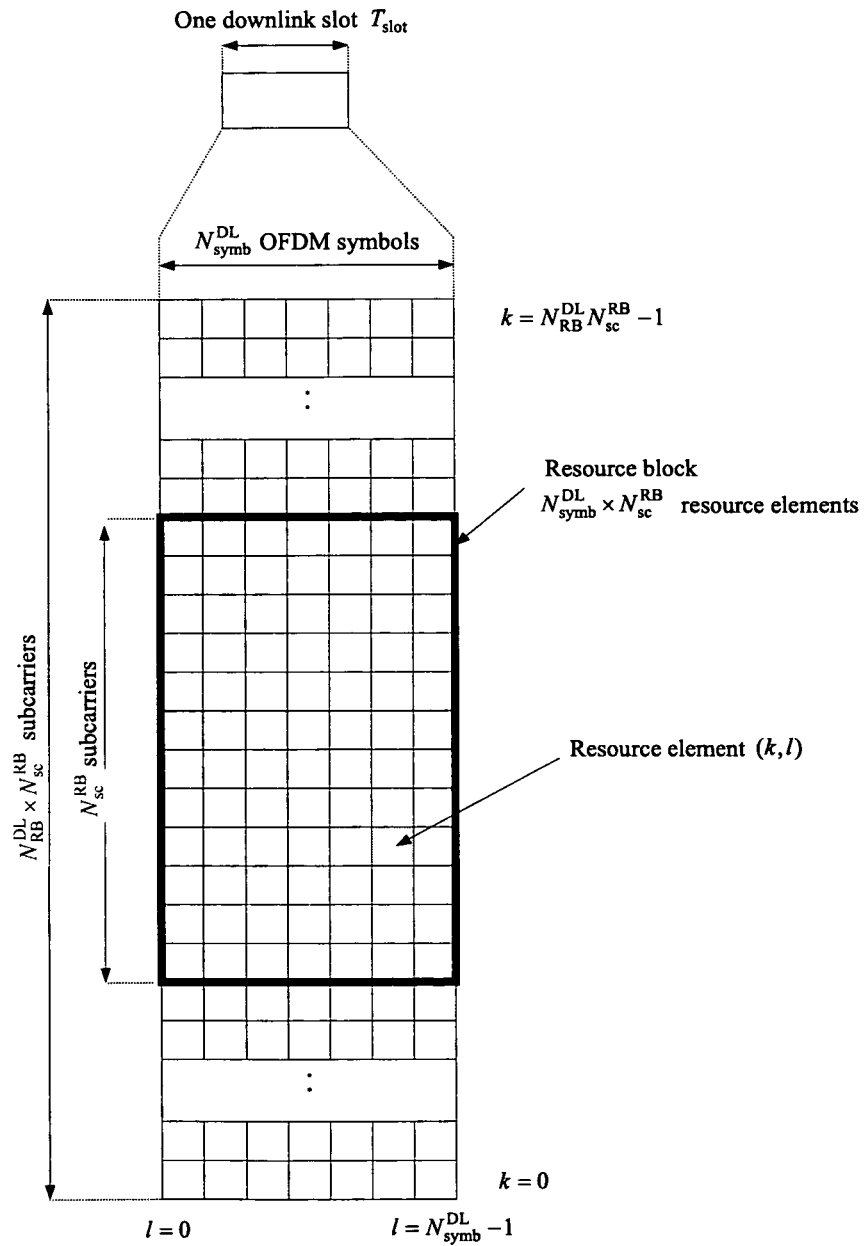
FIG. 4 shows an exemplary downlink resource grid of a downlink slot as defined for 3GPP LTE (Release 8/9)
Figure 5:
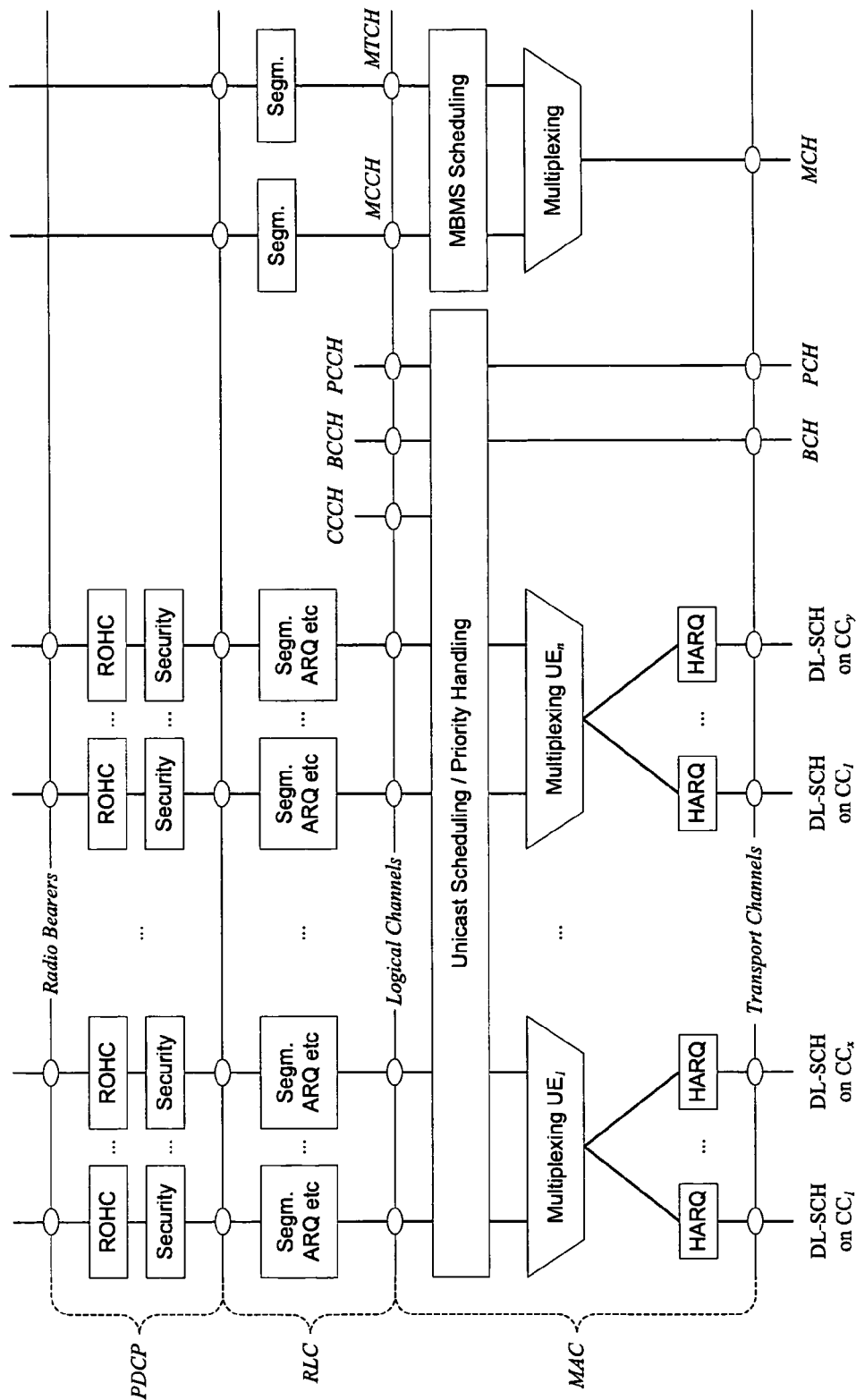
FIGS. 5 & 6 show the 3GPP LTE-A (Release 10) Layer 2 structure with activated carrier aggregation for the downlink and uplink, respectively.
Figure 6:
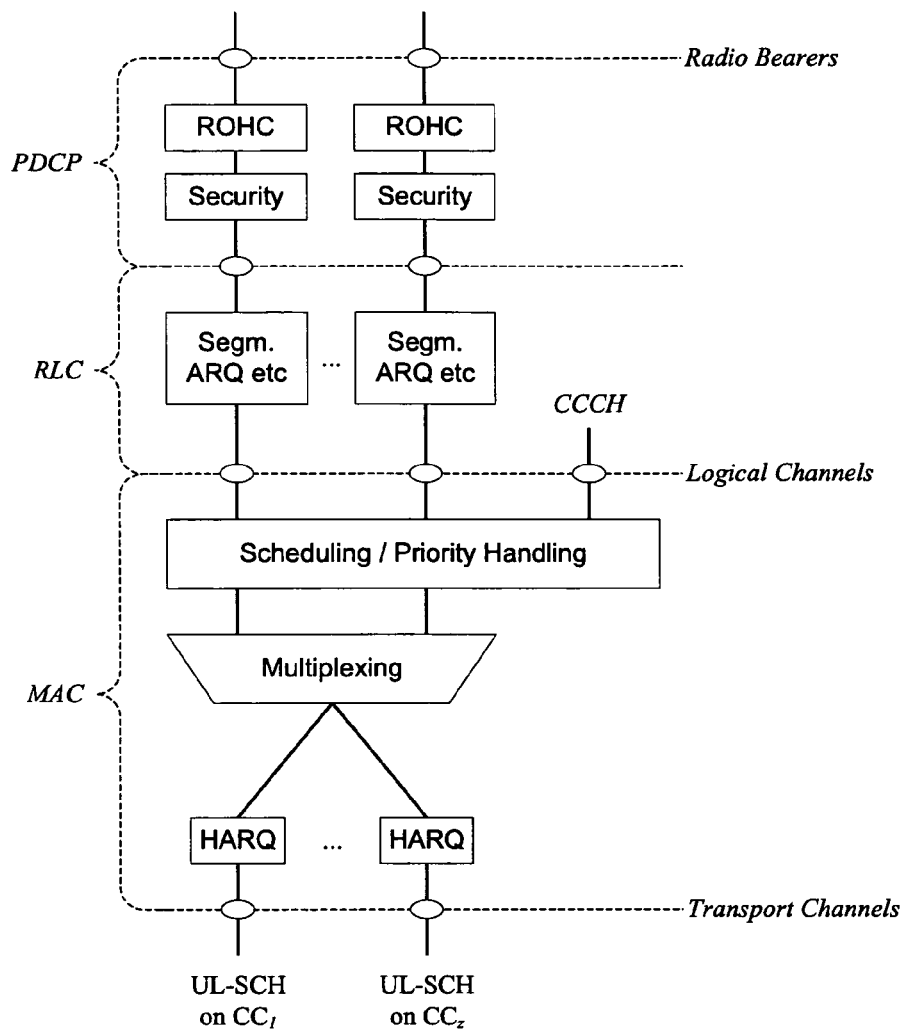

According to one embodiment of the second aspect of the invention, any uplink data from logical channels is prioritized over the extended power headroom reporting when the corresponding uplink resource is persistently scheduled. This procedure results in that the transport block is first filled with the uplink data e.g. time critical voice data. Since the transport block of the persistent allocation is not large enough to also accommodate the extended PHR, the extended PHR cannot be transmitted in the transport block. It should be noted that the extended PHR MAC control element cannot be segmented, because of the missing segmentation functionality of the MAC layer (see FIG. 6).

Figure 12:
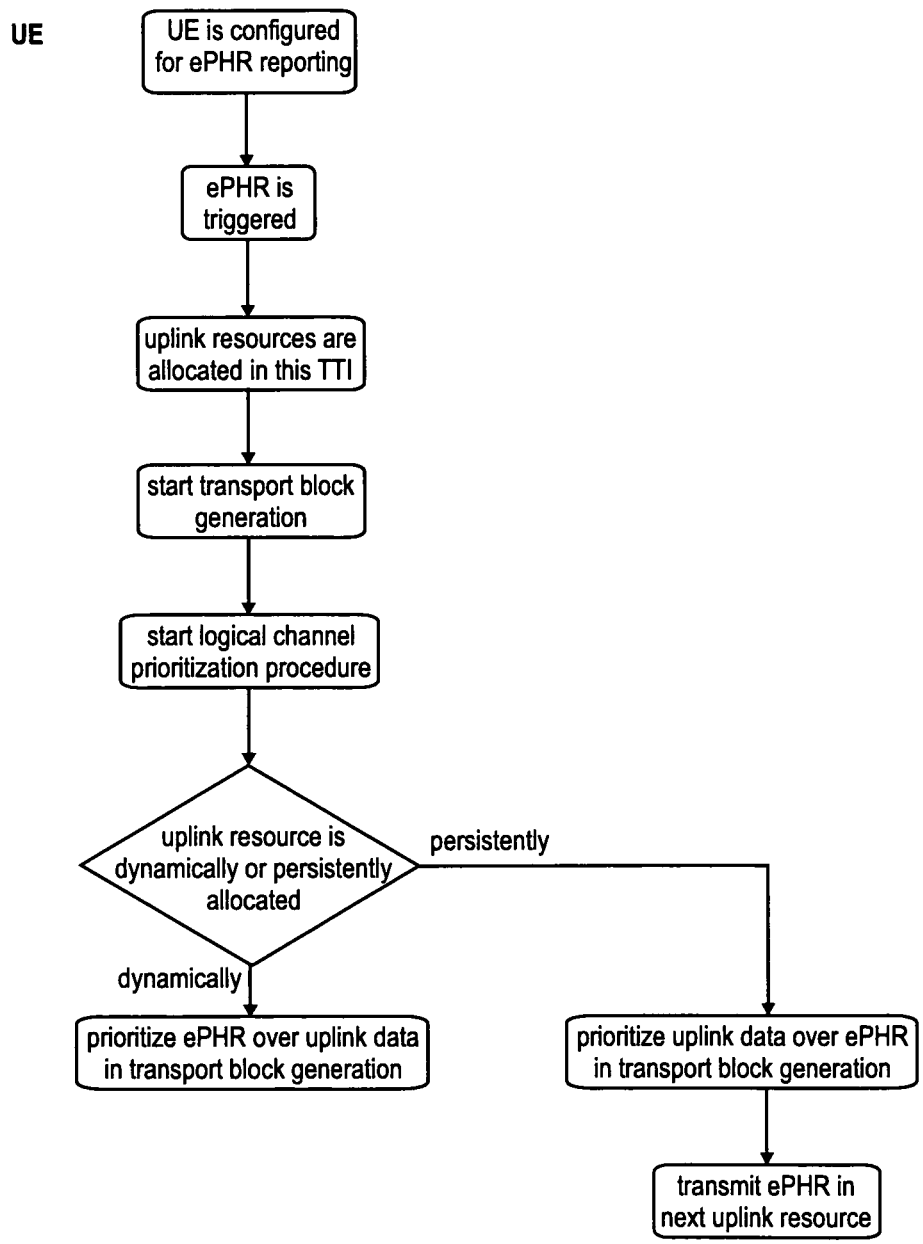
FIG. 12 is a flow diagram illustrating the procedure of transmitting by the user equipment power headroom information to the eNodeB depending on the type of scheduling for the uplink resource according to the second aspect of the invention.

The transport block thus only contains uplink data and padding bits if necessary. The extended power headroom report is then delayed and transmitted in the next possible uplink allocation, which is dynamically scheduled. This embodiment is depicted in FIG. 12, which illustrates the steps taken by the user equipment in order to transmit the extended power headroom report for persistently allocated uplink resources.

The standardization for the logical channel prioritization procedure would thus include a corresponding prioritization rule, which is expressed as follows according to one example:

For configured uplink resource assignments, data from any logical channel has a higher priority than ePHR MAC CE.

The term "configured uplink resource" as used in the technical specifications of the standardization corresponds to a persistently allocated uplink resource.

One benefit achieved thereby is that uplink data, and in particular voice data, is not segmented and hence delayed by including the extended power headroom report in the transport block. The extended power headroom report is delayed instead.

According to a further alternative embodiment of the second aspect of the invention, only voice data should be prioritized over the extended power headroom reporting. The delay introduced by extended power headroom reporting in combination with semi-persistently allocated uplink resources according to the prior art, is particularly disadvantageous for voice data which is especially time critical. This does not necessarily apply to other data, where time delays are not too negative.

The standardization for the logical channel prioritization procedure would thus include a corresponding prioritization rule, which is expressed as follows according to one example:

If an uplink grant is configured, data for a logical channel for which logical channel SR (Scheduling Request) masking (logicalChannelSR-Mask) is setup by upper layers has higher priority than ePHR MAC CE.

The above prioritization rule restricts the logical channels which are prioritized over the ePHR MAC CE for the case of persistently allocated resources to those logical channels for which the flag "logicalChannelSR-Mask" is set. Typically, this flag is set for logical channels which carry VoIP data for the case that semi-persistent scheduling is configured.

Figure 13:
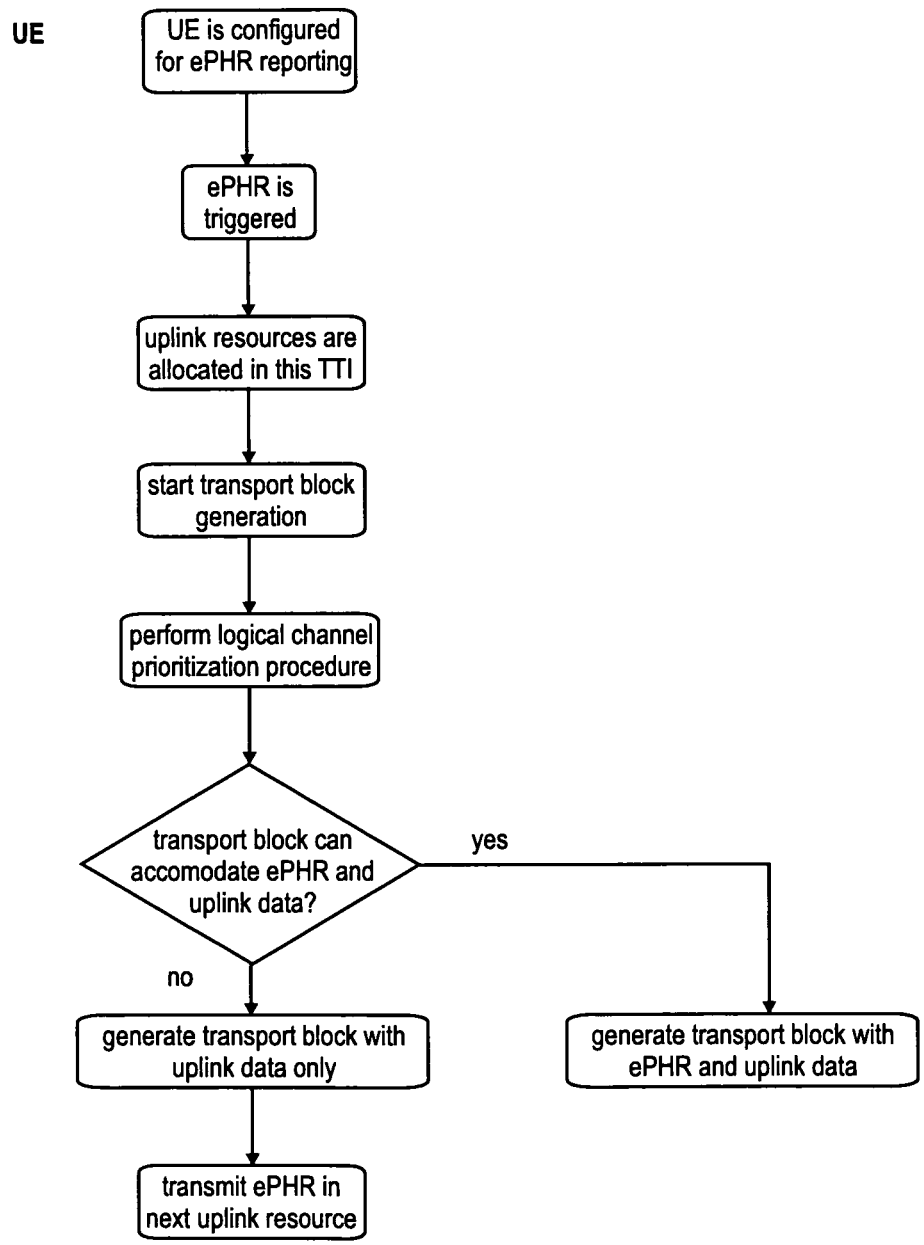
FIG. 13 is a flow diagram illustrating the procedure for transmitting by the user equipment power headroom information to the eNodeB according to a further embodiment of the invention.

According to a further alternative embodiment of the second aspect of the invention, the logical channel prioritization procedure is not changed, but the MAC procedure for generating the transport block is extended as follows. This will be explained with reference to FIG. 13, which illustrates the steps taken by the user equipment to transmit the extended power headroom report.

The MAC layer of the user equipment checks for a transport block which is to be transmitted in a persistently allocated uplink resource, whether the transport block can accommodate all pending uplink data available for transmission in addition to the extended power headroom report (including its subheader). In case the transport block is too small, only the uplink data is included in the transport block; the ePHR MAC control element thus is to be transmitted with an uplink resource later.

According to a still further alternative embodiment of the invention, standardization of power headroom reporting would be changed so that a combination of semi-persistent scheduling with extended power headroom reporting is prohibited. Basically, when the eNodeB configures and enables semi-persistent scheduling, only "basic" power headroom reporting can be configured.

In a further alternative solution, the configuration of power headroom reporting, i.e. extended or basic power headroom reporting is done per component carrier. In this case the eNB could configure "basic" power headroom reporting for the PCell for the case that semi-persistent scheduling is also configured for the PCell and at the same time extended power headroom reporting for aggregated SCells.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only. Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently and its enhancements (LTE-A) discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for transmitting power headroom information from a user equipment to a base station in an uplink resource within a Long Term Evolution (LTE) communication system, wherein the power headroom information is either a basic power headroom report or an extended power headroom report, and the user equipment is configured to report the power headroom information with extended power headroom reports, the method comprising the steps of:
   in case the uplink resource is scheduled via a persistent scheduling configuration, transmitting the basic power headroom report, not including the extended power headroom report, as power headroom information to the base station in the uplink resource, and
   in case the uplink resource is scheduled via a dynamic scheduling, transmitting the extended power headroom report as power headroom information to the base station in the uplink resource.

2. The method according to claim 1, further comprising the step of: determining whether the uplink resource for transmitting the power headroom information is scheduled via a persistent scheduling configuration or via a dynamic scheduling.

3. The method according to claim 1, wherein: the basic power headroom report provides information on available transmit power for one component carrier, and
   the extended power headroom report provides information about the available transmit power and corresponding maximum transmit power for each activated uplink component carrier.

4. The method according to claim 1, wherein: the basic power headroom report comprises information on a power headroom level for one component carrier, and
   the extended power headroom report comprises information on a power headroom level for each activated uplink component carrier and comprises information on a component carrier-specific maximum transmission power for each activated component carrier, and if an uplink shared channel transmission and an uplink control channel transmission is performed simultaneously, a power headroom level comprised in the extended power headroom report is calculated considering the uplink shared channel transmission and the uplink control channel transmission.

5. The method according to claim 1, further comprising the steps of: triggering the transmission of an extended power headroom report in the user equipment, in case the basic power headroom report is transmitted in the uplink resource, and
   transmitting the triggered extended power headroom report from the user equipment to the base station in a next possible uplink resource.

6. The method according to claim 1, further comprising the steps of: triggering the transmission of an extended power headroom report in the user equipment, in case the basic power headroom report is transmitted in the uplink resource, and
   transmitting the triggered extended power headroom report from the user equipment to the base station in a next possible uplink resource, that is scheduled via a dynamic scheduling.

7. The method according to claim 5, wherein a prohibition timer is used to prohibit the transmission of a second power headroom information for a particular time after transmitting a first power headroom information, and wherein the prohibition timer is ignored for the triggered extended power headroom report.

8. The method according to claim 5, wherein the prohibition timer is not restarted after transmitting the triggered extended power headroom report.

9. A user equipment for transmitting power headroom information to a base station in an uplink resource within a Long Term Evolution (LTE) communication system, wherein the power headroom information is either a basic power headroom report or an extended power headroom report, and the user equipment is configured to report the power headroom information with extended power headroom reports, the user equipment comprising:
   a transmitter adapted to transmit the basic power headroom report, not including the extended headroom report, as power headroom information to the base station in the uplink resource, in case the uplink resource is scheduled via a persistent scheduling configuration and
   the transmitter is adapted to transmit the extended power headroom report as power headroom information to the base station in the uplink resource, in case the uplink resource is scheduled via a dynamic scheduling.

10. The user equipment according to claim 9, further comprising:
   a processor adapted to determine whether the uplink resource for transmitting the power headroom information is scheduled via a persistent scheduling configuration or via a dynamic scheduling.

11. The user equipment according to claim 9, wherein the basic power headroom report provides information on available transmit power for one component carrier, and the extended power headroom report provides information about the available transmit power and corresponding maximum transmit power for each activated uplink component carrier, or
   wherein the basic power headroom report comprises information on a power headroom level for one component carrier, and the extended power headroom report comprises information on a power headroom level for each activated uplink component carrier and comprises information on a component carrier-specific maximum transmission power for each activated component carrier, and if an uplink shared channel transmission and an uplink control channel transmission is performed simultaneously, a power headroom level comprised in the extended power headroom report is calculated considering the uplink shared channel transmission and the uplink control channel transmission.

12. The user equipment according to claim 9, wherein the processor is further adapted to trigger the transmission of an extended power headroom report in the user equipment, in case the basic power headroom report is transmitted in the uplink resource, and the transmitter is adapted to transmit the triggered extended power headroom report from the user equipment to the base station in a next possible uplink resource, and in particular where the next possible uplink resource is scheduled via a dynamic scheduling.

13. The user equipment according to claim 12, further comprising a prohibition timer, wherein the prohibition timer is used to prohibit the transmission of a second power headroom information for a particular time after transmitting a first power headroom information, and wherein the prohibition timer is ignored for the triggered extended power headroom report, and wherein the prohibition timer is not restarted after transmitting the triggered extended power headroom report.

* * * * *